US010664767B2

(12) United States Patent
Takigawa et al.

(10) Patent No.: US 10,664,767 B2
(45) Date of Patent: May 26, 2020

(54) MACHINE LEARNING APPARATUS, LASER MACHINING SYSTEM AND MACHINE LEARNING METHOD

(71) Applicant: FANUC CORPORATION, Yamanashi (JP)

(72) Inventors: Hiroshi Takigawa, Yamanashi (JP); Akinori Ohyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 693 days.

(21) Appl. No.: 15/460,850

(22) Filed: Mar. 16, 2017

(65) Prior Publication Data
US 2017/0270434 A1 Sep. 21, 2017

(30) Foreign Application Priority Data
Mar. 17, 2016 (JP) ................................. 2016-054190

(51) Int. Cl.
| | |
|---|---|
| *G06N 20/00* | (2019.01) |
| *B23K 26/08* | (2014.01) |
| *B23K 26/21* | (2014.01) |
| *B23K 26/38* | (2014.01) |
| *G06N 3/00* | (2006.01) |
| *G06N 3/08* | (2006.01) |

(Continued)

(52) U.S. Cl.
CPC ............ *G06N 20/00* (2019.01); *B23K 26/032* (2013.01); *B23K 26/083* (2013.01); *B23K 26/21* (2015.10); *B23K 26/38* (2013.01); *B23K 26/707* (2015.10); *G06N 3/006* (2013.01); *G06N 3/084* (2013.01); *G05B 2219/45041* (2013.01)

(58) Field of Classification Search
CPC ........ G06N 20/00; G06N 20/10; G06N 20/20; G06N 3/006; G06N 3/084; B23K 26/083; B23K 26/21; B23K 26/38; B23K 26/707; B23K 26/032; B23K 26/702; G05B 2219/45041
USPC ........................................................ 706/12
See application file for complete search history.

(56) References Cited

U.S. PATENT DOCUMENTS

| 9,056,368 B2 | 6/2015 | Wersborg | |
|---|---|---|---|
| 2005/0092722 A1* | 5/2005 | Dane .................... | B23K 26/032 219/121.73 |

(Continued)

FOREIGN PATENT DOCUMENTS

| JP | 03043132 A | 2/1991 |
|---|---|---|
| JP | 03263203 A | 11/1991 |
| JP | H 04-75108 A | 3/1992 |

(Continued)

*Primary Examiner* — Shane D Woolwine
(74) *Attorney, Agent, or Firm* — RatnerPrestia

(57) ABSTRACT

A machine learning apparatus that learns laser machining condition data of a laser machining system includes: a state amount observation unit that observes a state amount of the laser machining system; an operation result acquisition unit that acquires a machined result of the laser machining system; a learning unit that receives an output from the state amount observation unit and an output from the operation result acquisition unit, and learns the laser machining condition data in association with the state amount and the machined result of the laser machining system; and a decision-making unit that outputs laser machining condition data by referring to the laser machining condition data learned by the learning unit.

20 Claims, 9 Drawing Sheets

(51) Int. Cl.
*B23K 26/70* (2014.01)
*B23K 26/03* (2006.01)

(56) References Cited

U.S. PATENT DOCUMENTS

2013/0155483 A1* 6/2013 Margalit ................ G02F 1/093
 359/280
2017/0148102 A1* 5/2017 Franke ................... G06Q 10/20

FOREIGN PATENT DOCUMENTS

| | | |
|---|---|---|
| JP | H 04-354653 A | 12/1992 |
| JP | H 11-85210 A | 3/1999 |
| JP | 2004074253 A | 3/2004 |
| JP | 2008-36812 A | 2/2008 |
| JP | 2012509190 A | 4/2012 |
| JP | 2012-236267 A | 12/2012 |
| JP | 2013055084 A | 3/2013 |
| WO | 2011083087 A1 | 7/2011 |

* cited by examiner

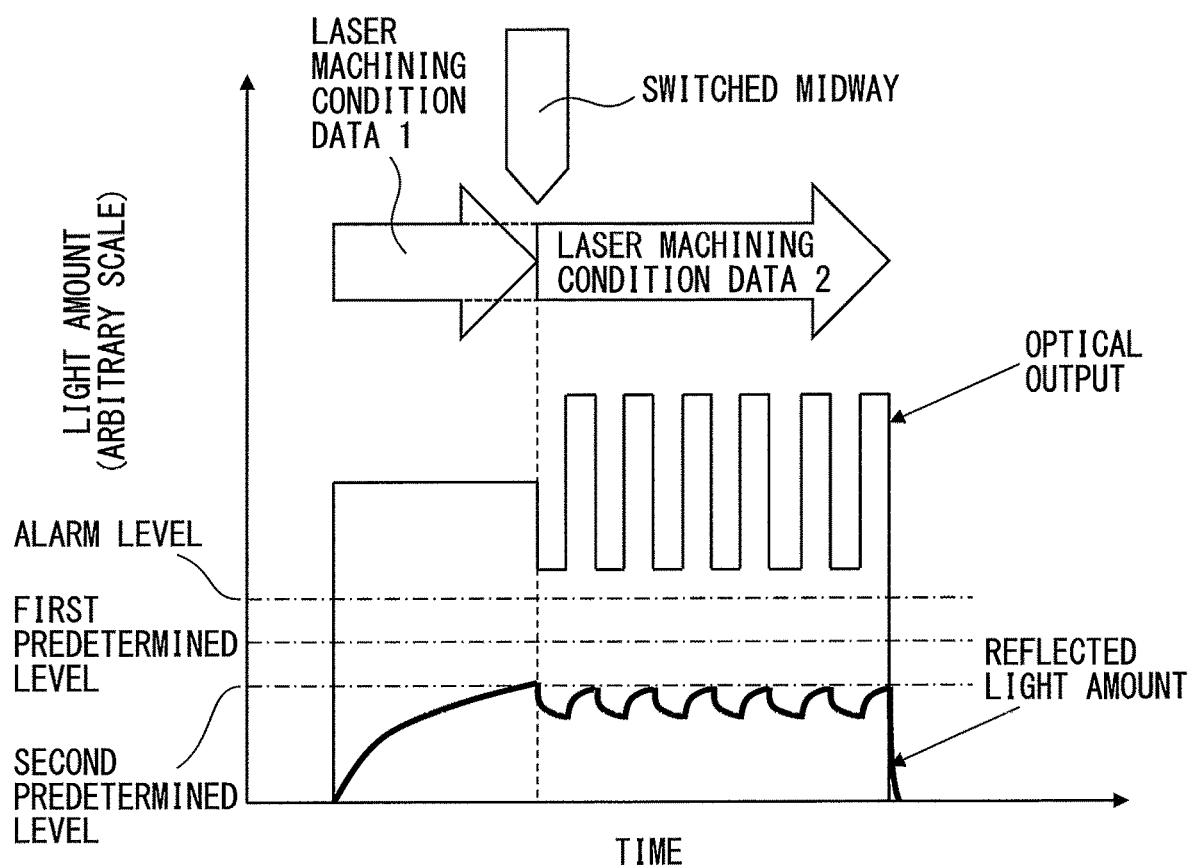

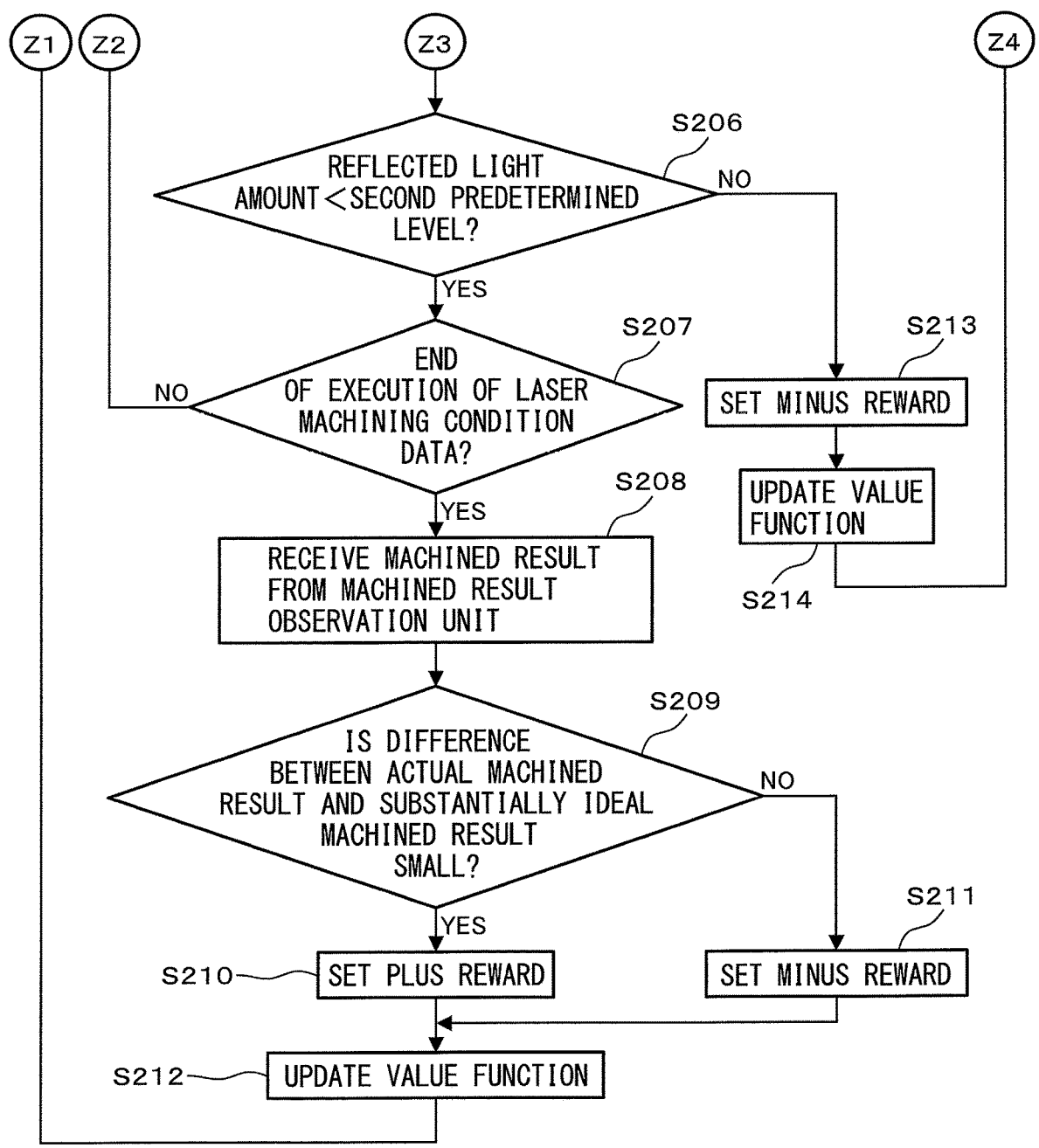

MACHINE LEARNING APPARATUS, LASER MACHINING SYSTEM AND MACHINE LEARNING METHOD

BACKGROUND OF THE INVENTION

1. Field of the Invention

The present invention relates to a machine learning apparatus that learns laser machining condition data including driving power data supplied to a laser oscillator, a laser machining system, and a machine learning method.

2. Description of the Related Art

In the laser machining system that performs machining such as cutting or welding for a workpiece, the machining is preferably performed under an optimal laser machining condition so as to obtain machined processing results high in machining accuracy and machining quality at a high speed.

There are various techniques for searching for or learning machining conditions. For example, Japanese Unexamined Patent Publication (Kokai) No. 4-75108 discloses "an automatic machining condition determination apparatus including: an attribute data storage unit that stores data relating to a workpiece, data relating to a tool, and data relating to a machine; a neural network in which the data stored in the attribute data storage unit is an input and an internal constant in an arithmetic equation for determining a machining condition of a numerically controlled machine tool is an output; a machining condition arithmetic unit that obtains a machining condition based on the data stored in the attribute data storage unit and the internal constant; an internal constant correction unit that corrects, when the machining condition is corrected, the associated internal constant according to a correction value of the machining condition; and a weight correction unit that corrects a weight of the neural network so as to obtain the internal constant corrected by the internal constant correction unit with respect to the same input as that before the correction".

Further, Japanese Unexamined Patent Publication (Kokai) No. 4-354653 discloses "a machining condition generation apparatus including: a machining condition generation unit; a machining condition characteristic data unit that stores characteristic data preferably used for generating the machining condition; and a learning unit that optimizes the machining condition based on a learning function, in which a changed data unit that stores a changed content of the machining condition is provided, the machining condition is changed according to the changed content, and the learning unit optimizes at least one of the machining condition generation unit and the machining condition characteristic data unit based on the changed content."

Further, Japanese Unexamined Patent Publication (Kokai) No. 11-85210 discloses "a laser machining machine assistance apparatus including: an inference value generation unit that generates an inference value with respect to a machining condition parameter of laser machining by an artificial intelligence function; a display unit that displays the inference value generated by the inference value generation unit; and an input unit that inputs an evaluation parameter for evaluating a machining state, in which the inference value generation unit includes a machining condition parameter selection unit that selects a machining condition parameter most effective for correcting a current machining state."

Further, Japanese Unexamined Patent Publication (Kokai) No. 2008-36812 discloses "a machining condition search apparatus including: an experimental machining condition generation unit; a machine that performs machining under a machining condition output from the experimental machining condition generation unit to output a real machined result; and a machining characteristic model unit that generates a machining characteristic model as an optimal machining condition when a predetermined machining condition is input, in which the experimental machining condition generation unit generates an experimental machining condition by using the machining characteristic model."

Further, Japanese Unexamined Patent Publication (Kokai) No. 2012-236267 discloses "a machining condition search apparatus including: an experimental machining condition generation unit that generates an experimental machining condition by using a machining characteristic model showing a relationship between a machining condition and a machined result; a machined result collection unit that collects machined results of experimental machining according to the experimental machining condition generated by the experimental machining condition generation unit, and stores a set of the machined result and the experimental machining condition as experimental machining data; a first machining characteristic model generation unit that outputs a machining characteristic model newly generated by using the experimental machining data to the experimental machining condition generation unit; a second machining characteristic mode generation unit that generates, for each experimental machining data, while changing machining quality evaluations included in the machined results in the experimental machining data one by one, a new machining characteristic model reflecting the changed machining quality evaluations; a machining characteristic model synthesis unit that synthesizes the new machining characteristic model generated by the second machining characteristic model generation unit; and an optimal machining condition generation unit that generates an optimal machining condition from the machining characteristic model synthesized by the machining characteristic model synthesis unit."

SUMMARY OF THE INVENTION

Machining conditions in laser machining include such oscillation conditions as an optical output, a mode, a waveform and a wavelength, and such emission conditions as a condensing optical system, a power density, a power density distribution, and assist gas. As other machining conditions, there are many parameters such as a machining speed and a machining atmosphere.

In addition, even in the case of a state amount of a laser machining system that may affect a machined result of laser machining, there are a temperature of a laser oscillator, an optical system, a structural component that supports a workpiece, or the like, and a state of a cooling system that cools the laser oscillator or the like. When the workpiece is regarded as a component of the laser machining system in a broad sense, the state amount of the laser machining system includes a temperature, a surface state or the like of the workpiece changed depending on laser machining.

It is therefore very difficult to determine laser machining condition data optimal for obtaining a high-quality and highly accurate machined result at a high speed with consideration given to the state amount of the laser machining system in addition to the machining conditions.

Further, in the aforementioned conventional technology, the machined result is not associated with a state amount of a machining apparatus. As a result, the conventional technology has a problem that an optimal machining condition is not set when the state amount of the machining apparatus changes.

In addition, for example, bead-like deposits (dross) are formed on front and rear surfaces near a cut portion of the workpiece cut by the laser machining. It is not easy to quantitatively evaluate a machined result including an amount of dross or the like. Thus, even when the machined result is fed back, it is difficult to know the optimal laser machining condition data.

As described above, the laser machining conditions include many parameters, there are many unclear points as to the influence of the state of the laser machining system on the machined result, and there are machined results not subjected to quantitative evaluation. The machining conditions have hitherto been determined based on past experience, a machining achievement, an experimental result or the like. However, it is not clear whether the determined machining condition is truly optimal. The determination of the machining condition is affected by operator's experience or skill. Further, there is a problem of requiring a long time and many man-hours in determining the machining condition.

The present invention has been made with the foregoing situation in mind, and has an object to provide a machine learning apparatus that can determine laser machining condition data enabling, even when there are many laser machining condition parameters and many state amounts of a laser machining system that may affect a laser machined result, acquisition of an optimal or substantially optimal machined result in order to obtain a high-quality and highly accurate machined result at a high speed with consideration given to the influence of a state of the laser machining system on the laser machined result, a laser machining system that includes the machine learning apparatus, and a machine learning method of the machine learning apparatus.

In order to achieve the object, according to a first aspect of the present invention, there is provided a machine learning apparatus for learning laser machining condition data of a laser machining system. The laser machining system includes: at least one laser apparatus that includes at least one laser oscillator; at least one machining head that emits a laser beam from the laser apparatus to a workpiece; at least one output light detection unit that detects an amount of the laser beam emitted from the machining head; at least one reflected light detection unit that detects a reflected light emitted from the machining head and reflected on a surface or near the surface of the workpiece to return to the laser apparatus via an optical system in the machining head; at least one machined result observation unit that observes at least one of a machining state and a machining result of the workpiece at least during laser machining or after the laser machining; and at least one driving apparatus that changes a relative positional relationship between the machining head and the workpiece. The machine learning apparatus includes: a state amount observation unit that observes a state amount of the laser machining system; an operation result acquisition unit that acquires a machined result of the laser machining system; a learning unit that receives an output from the state amount observation unit and an output from the operation result acquisition unit, and learns the laser machining condition data in association with the state amount of the laser machining system and the machined result; and a decision-making unit that outputs laser machining condition data by referring to the laser machining condition data leaned by the learning unit.

According to a second aspect of the present invention, in the machine learning apparatus according to claim 1, when machining of the workpiece based on given laser machining condition data, an amount of the reflected light detected by the reflected light detection unit exceeds a second predetermined level set lower than a first predetermined level set lower than an alarm level indicating that at least one of the machining head, the laser apparatus, and a laser light propagation optical component between the machining head and the laser apparatus may be damaged by the reflected light, the learning unit refers to the learned laser machining condition data and outputs laser machining condition data predicted to be obtained a machined result close to a machined result of the given laser machining condition data without the amount of the reflected light detected by the reflected light detection unit exceeding the second predetermined level.

According to a third aspect of the present invention, in the machine learning apparatus according to the first or second aspect, the state amount observed by the state amount observation unit includes at least one of the followings: optical output characteristics of the laser apparatus indicating a relationship between an optical output command for the laser apparatus and an optical output actually emitted from the laser apparatus; an optical output emitted from the laser apparatus; a ratio of an optical output emitted from the machining head to the optical output from the laser apparatus; a temperature of a portion thermally connected to the laser oscillator; temperatures of portions including a component changed in temperature due to laser oscillation in the laser apparatus; a temperature of the machining head; a temperature of the optical system that propagates the laser light from the laser apparatus to the machining head; a temperature of the driving apparatus; a temperature of a structural component that supports the machining head or the driving apparatus; a kind, a temperature, and a flow rate of fluids for cooling the component increased in temperature due to the laser oscillation; a temperature and humidity of air in the laser apparatus; an environmental temperature and humidity around the laser apparatus; an actual current of a driving motor of the driving apparatus; an output from a position detection unit of the driving apparatus; and sizes including a thickness, material quality, specific heat, a density, heat conductivity, a temperature, and a surface state of the workpiece.

According to a fourth aspect of the present invention, in the machine learning apparatus according to any one of the first to third aspects, the laser machining condition data output from the decision-making unit includes at least one of the followings: an optical output, an optical waveform, beam mode, and a laser wavelength of the laser beam emitted from each laser apparatus; a focal distance, an F-value, and a transmittance of the optical system that emits the laser beam; a relative positional relationship including a time change between a focus of the laser beam emitted to the workpiece and a machined surface of the workpiece; a spot size, a power density, and a power density distribution of the laser beam emitted to the workpiece on the machined surface of the workpiece; a relative positional relationship including a time change between the machining head and the workpiece; an angle formed between an optical axis of the laser beam and the machined surface of the workpiece; a machining speed; and a kind and a flow rate or supply pressure of assist gas.

According to a fifth aspect of the present invention, in the machine learning apparatus according to the second aspect, the learning unit includes: a learning model for learning laser machining condition data varied from one laser machining content to another; an error calculation unit that calculates a difference between a laser machined result including a machining speed or time expended for predetermined machining obtained by the operation result acquisition unit and a substantially ideal machined result or a target machined result including a machining speed or time expended for predetermined machining set for each laser machining content; and a learning model update unit that updates the learning model according to the difference.

According to a sixth aspect of the present invention, in the machine learning apparatus according to the fifth aspect, in the learning unit, the error calculation unit outputs, when the amount of the reflected light detected by the reflected light detection unit exceeds the second predetermined level during the machining of the workpiece based on the given laser machining condition data, a calculation result indicating that a predetermined difference has occurred between the machined results of the laser machining condition data, and the learning model is updated according to the calculation result.

According to a seventh aspect of the present invention, in the machine learning apparatus according to the second aspect, the learning unit has a value function varied from one laser machining content to another and defining a value of laser machining condition data, and further includes: a reward calculation unit that provides, when a difference between a laser machined result including a machining speed or time expended for predetermined machining obtained by the operation result acquisition unit and a substantially ideal machined result or a target machined result including a machining speed or time expended for predetermined machining set for each laser machining content is small, a plus reward according to the difference, and when the difference is large, provides a minus reward according to the difference; and a value function update unit that updates the value function according to the reward.

According to an eighth aspect of the present invention, in the machine learning apparatus according to the seventh aspect, in the learning unit, the reward calculation unit provides a predetermined minus reward when the amount of the reflected light detected by the reflected light detection unit exceeds the second predetermined level during the machining of the workpiece based on the given laser machining condition, and the value function is updated according to the predetermined minus reward.

According to a ninth aspect of the present invention, there is provided a laser machining system provided with the machine learning apparatus according to any one of the first to eighth aspects. The laser machining system includes: the laser apparatus; the machining head; the output light detection unit; the reflected light detection unit; the machined result observation unit; and the driving apparatus, in which at least one each is provided; and at least one control apparatus that controls the laser apparatus, the machining head, the output light detection unit, the reflected light detection unit, the machined result observation unit, and the driving apparatus.

According to a tenth aspect of the present invention, in the laser machining system according to the ninth aspect, when the amount of the reflected light detected by the reflected light detection unit exceeds the first predetermined level, the control apparatus cuts off or reduces to a predetermined ratio the optical output from the laser apparatus without waiting for outputting of next laser machining condition data from the machine learning apparatus.

According to an eleventh aspect of the present invention, in the laser machining system according to the ninth or tenth aspect, optical output characteristics of the laser apparatus indicating a relationship between an optical output command from the control apparatus and an optical output actually emitted from the laser apparatus are stored in the laser apparatus or the control apparatus; and the optical output characteristics are measured along a predetermined schedule, and the optical output characteristics of the laser apparatus are updated based on a measurement result.

According to a twelfth aspect of the present invention, in the laser machining system according to any one of the ninth to eleventh aspects, at least one of the machined result observation units is any one of a digital two-dimensional imaging apparatus, a CCD measurement microscope, a contact-type surface roughness/shape measurement apparatus, a white light interferometer, a laser microscope, and a non-contact three-dimensional measurement apparatus; and at least one data among smoothness or surface roughness of a laser cut surface, a volume of bead-like deposits formed on front and rear surfaces near a cut portion per unit cut length, a sputter deposition amount per unit area on the rear surface, an oxide color density on the cut surface, cutting size/shape accuracy, and observation result data of perpendicularity of the cut surface is output as the result of the laser machining condition data from the machined result observation unit to the operation result acquisition unit.

According to a thirteenth aspect of the present invention, in the laser machining system according to any one of the ninth to eleventh aspects, at least one of the machined result observation units is any one of a digital two-dimensional imaging apparatus, a CCD measurement microscope, a laser microscope, a light excitation nondestructive inspection apparatus including a light source and an infrared camera, an ultrasonic flaw detection testing apparatus, an induction heating nondestructive inspection apparatus, a radiation transmission imaging apparatus, and an acoustic emission testing apparatus; and at least one observation result data among cracks in a welded portion, a blowhole, a pinhole, a lack of penetration, an incomplete fusion, undercut/overlap, and humping caused by the laser, is output as the result of the laser machining condition data from the machined result observation unit to the operation result acquisition unit.

According to a fourteenth aspect of the present invention, in the laser machining system according to any one of the ninth to thirteenth aspects, a plurality of laser apparatuses is present, and a plurality of machine learning apparatuses installed in the respective laser machining systems share or exchange data with each other via a communication medium.

According to a fifteenth aspect of the present invention, in the laser machining system according to any one of the ninth to fourteenth aspects, the machine learning apparatus is shared by the plurality of laser machining systems via the communication medium.

According to a sixteenth aspect of the present invention, there is provided a machine learning method for learning laser machining condition data output to a control apparatus of a laser machining system. The method includes: observing a state amount of the laser machining system including output data from at least one laser apparatus, output data from at least one machining head, and output data from at least one driving apparatus for changing a relative positional relationship between the machining head and a workpiece; receiving, as results of laser machining condition data, output data from at least one reflected light detection unit that detects a reflected light returning to the laser apparatus, and output data from at least one machined result observation unit that observes at least one of a machining state and a machined result of the workpiece at least during laser machining or after an end of the laser machining; and learning the laser machining condition data in association with the state amount of the laser machining system and the results of the laser machining condition data.

BRIEF DESCRIPTION OF THE DRAWINGS

These objects, features and advantages, and other objects, features and advantages of the present invention will be more clearly understood from the following detailed description of the exemplary embodiments of the invention in conjunction with the accompanying drawings, in which:

FIG. 2 is a time chart schematically illustrating a state where laser machining condition data is switched due to a reflected light amount to change an optical output waveform;

FIG. 5B is a second flow chart illustrating an example of the operation of the machine learning apparatus illustrated in FIG. 4;

DETAILED DESCRIPTION

Figure 1:
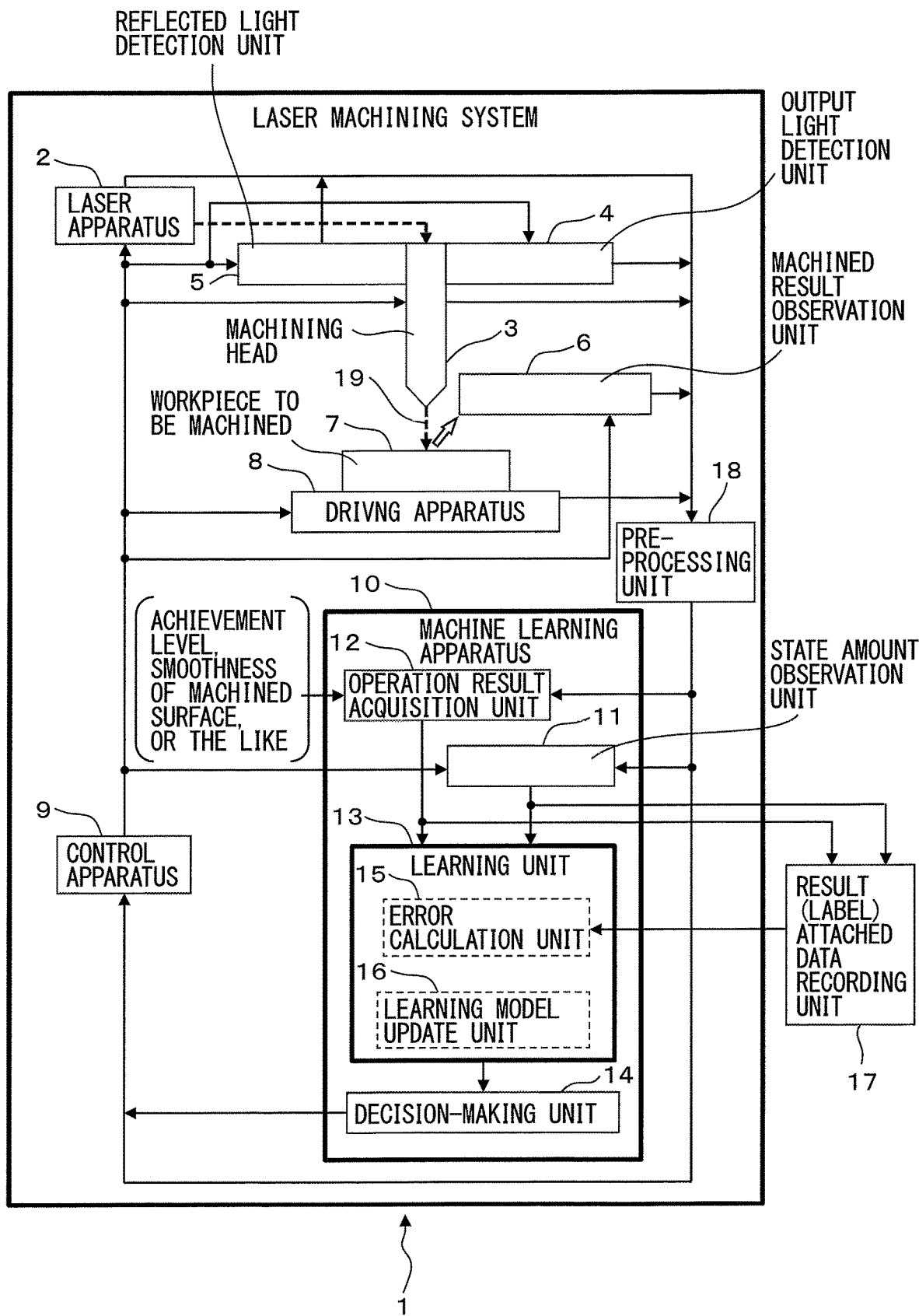
FIG. 1 is a block diagram illustrating a conceptual configuration of a laser machining system according to an embodiment of the present invention.

Hereinafter, a machine learning apparatus, a laser machining system, and a machine learning method according to the embodiments of the present invention will be described with reference to the accompanying drawings. Throughout the drawings, similar members are assigned similar reference numerals. Components assigned similar reference numerals in different drawings have similar functions. For easier understanding, the drawings are appropriately changed in reduction scale.

FIG. 1 is a block diagram illustrating a conceptual configuration of a laser machining system 1 according to an embodiment of the present invention. The laser machining system 1 according to the present embodiment includes: at least one laser apparatus 2 that includes at least one laser oscillator; at least one machining head 3 that emits a laser beam 19 from the laser apparatus 2 to a workpiece; at least one output light detection unit 4 that detects a light amount of the output laser light 19; at least one reflected light detection unit 5 that detects a reflected light emitted from the machining head 3 and reflected on a surface of the workpiece 7 or near the surface to return to the laser apparatus 2 via an optical system in the machining head 3; at least one machined result observation unit 6 that observes a machining state and/or a machined result of the workpiece 7 during laser machining and/or after the laser machining; at least one driving apparatus 8 that changes a relative positional relationship between the machining head 3 and the workpiece 7; and a machine learning apparatus 10. The machine learning apparatus 10 includes a state amount observation unit 11, an operation result acquisition unit 12, a learning unit 13, and a decision-making unit 14.

The learning unit 13 of the machine learning apparatus 10 receives an output from the state amount observation unit 11 that observes a state amount of the laser machining system 1 and an output from the operation result acquisition unit 12 that acquires a machined result of the laser machining system 1, and learns laser machining condition data in association with the state amount and the machined result of the laser machining system 1. Then, the decision-making unit 14 decides and outputs, by referring to the laser machining condition data learned by the learning unit 13, laser machining condition data to the control apparatus 9.

For example, when the machined result observation unit 6 is an evaluation apparatus such as a non-contact three-dimensional measurement apparatus, instead of direct inputting of output data from the machined result observation unit 6 to the machine learning apparatus 10, the process may be performed by a pre-processing unit 18 as illustrated in FIG. 1. For example, the pre-processing unit 18 may convert a three-dimensional shape obtained obliquely with respect to an observation surface into a three-dimensional shape seen from a vertical direction with respect to the observation surface, or convert a projected foreign object from three-dimensional shape data into volume data of the projected foreign object in order to convert the observed data into data easily used by the machine learning apparatus 10.

An installation position of the pre-processing unit 18 is not limited to a position shown in FIG. 1. For example, to pre-process the output data from the machined result observation unit 6, the pre-processing unit 8 may be installed at a position through which only an output signal line of the machined result observation unit 6 passes. When the operation result acquisition unit 12 or the state amount observation unit 11 has a similar pre-processing function, the pre-processing unit 18 may not be provided. The state amount observation unit 11 and the operation result acquisition unit 12 constitute a functional block, and it can be understood that one block achieves both functions.

Preferably, the machined result observation unit 6 automatically observes the machining state and/or the machined result of the workpiece 7 during the laser machining and/or after the laser machining basically without any human intervention. When automation is difficult, cost is high, or the like, a human may operate the machined result observation unit 6 to perform observation, and input an observation result.

The driving apparatus 8 changes the relative positional relationship between the machining head 3 and the workpiece 7 as described above. Thus, the driving apparatus 8 may be provided on the workpiece 7 side as illustrated in FIG. 1, on the machining head 3 side, or on both the workpiece 7 side and the machining head 3 side.

As the driving apparatus 8, a driving apparatus 8 using a linear motor or the like may generally be used. However, the driving apparatus 8 may be a robot that moves the workpiece 7 to the machining head or directs the workpiece toward the machined result observation unit 6 so as to facilitate observation of a machined cut surface. When the workpiece 7 is not flat but three-dimensional in shape, or the like, the machining head 3 may be fitted to a hand of the robot. In FIG. 1, a machining bed and the robot hand provided between the driving apparatus 8 and the workpiece 7 or the machining head 3 are omitted. A structure for supporting the driving apparatus 8 or the machining head 3 is also omitted.

The machining state and/or the machined result of the workpiece 7 during the laser machining and/or after the laser machining is observed by the machined result observation unit 6. Then, the laser machining condition data is machine-learned in association with state amounts of the laser machining system 1 including a state amount of the laser machining system 1 changed during the laser machining due to emission of a laser beam 19 and the machined result of the laser machining. Accordingly, without any human intervention or with minimum human intervention, machining can be performed always under an optimal or substantially optimal laser machining condition irrespective of a state of the laser machining system 1, and a high-quality machined result can be stably obtained.

The laser machining system 1 includes at least one laser apparatus 2, and the laser apparatus 2 includes at least one laser oscillator. There are no restrictions on types of laser oscillators. A carbon dioxide laser, a solid-state laser using a YAG crystal or the like as an excitation medium, a fiber laser using an optical fiber as an excitation medium, or a direct diode laser directly using the laser light 19 from a laser diode may be used. The control apparatus 9 issues a command to a power source unit of the laser apparatus 2 to supply a driving current or driving power suited for each laser oscillator to the laser oscillator. The power source unit is provided in the laser apparatus 2 herein, but not illustrated in FIG. 1. However, the installation place of the power source unit is not limited in the laser apparatus 2.

In FIG. 1, a broken-line arrow simulatively represents rays of the laser light 19. However, not limited to a ray propagated through a space, for example, rays including a ray propagated through the optical fiber or the like are simulatively illustrated. Preferably, the machining head 3 includes an optical system configured to focus the laser beam 19 emitted from the machining head 3 approximately on the surface of the workpiece 7.

In FIG. 1, the reflected light detection unit 5 is installed in the machining head 3. However, the reflected light detection unit 5 may be installed in any one of light propagation paths in the laser apparatus 2, or in both light propagation paths in the machining head 3 and the laser apparatus 2. When a light is propagated through the space, for example, a light branched by a half mirror may be detected by the reflected light detection unit 5. When the light is propagated through the optical fiber, for example, an optical output from a tail end of the optical fiber branched by using an optical branching device may be detected by the reflected light detection unit 5. Leaking light from a clad of the optical fiber may be detected by the reflected light detection unit 5. These may not impose any restrictions on an entry method of the reflected light into the reflected light detection unit 5.

Though not illustrated in FIG. 1, when there are a plurality of laser apparatuses 2, a plurality of laser lights 19 may be combined by an optical coupler. When there are a plurality of laser oscillators in the laser apparatus 2, similarly, lights may be combined by the optical coupler to be output as one laser beam.

FIG. 2 is a time chart schematically illustrating a state where laser machining condition data is switched due to a reflected light amount to change an optical output waveform. As illustrated in FIG. 2, when machining of the workpiece 7 based on given laser machining condition data 1, the reflected light amount detected by the reflected light detection unit 5 and received as one of the outputs from the operation result acquisition unit 12 exceeds a second predetermined level set lower than a first predetermined level set lower than an alarm level indicating that at least one of the machining head 3, the laser apparatus 2, and a laser light propagation optical component between the machining head 3 and the laser apparatus 2 may be damaged by the reflected light, the learning unit 13 changes the laser machining condition data thereof to another laser machining condition data 2 by referring to the learned laser machining condition data.

Another laser machining condition data 2 is preferably laser machining condition data where the reflected light amount detected by the reflected light detection unit 5 does not exceed the second predetermined level and a machined result close to a machined result based on the aforementioned given laser machining condition data 1 within an allowable range is predicted to be obtained.

In the example illustrated in FIG. 2, the light is changed in output waveform from a CW light to that where a pulsed light is superimposed on the CW light. However, the output waveforms of the laser light 19 before and after the switching of the laser machining condition data are not limited to those illustrated in FIG. 2. Instead of changing the output waveform as the laser machining condition data, a focus position of the laser beam 19 may be separated from a surface of the workpiece 7, or the output waveform of the laser and the focus position of the laser beam 19 may both be changed. Any of controllable laser machining conditions may be changed.

Before the level of the reflected light from the surface of the workpiece 7 reaches the alarm level, a condition is changed to a condition where the reflected light is reduced and the substantially similar machined result is predicted to be obtained by referring to the learning result of the learning unit 13. Thus, the machining can be continued while preventing damaging of the laser apparatus 2, the machining head 3 or the like.

The state amount observed by the state amount observation unit 11 can include at least one of the followings: optical output characteristics of the laser apparatus 2 indicating a relationship between an optical output command from the control apparatus 9 and an optical output actually emitted from the laser apparatus 2; an optical output emitted from the laser apparatus 2; a ratio of an optical output emitted from the machining head 3 to the optical output from the laser apparatus 2 (transmittance); a temperature of a portion thermally connected to the laser oscillator in the laser apparatus 2; temperatures of portions including a component changed in temperature due to laser oscillation in the laser apparatus 2; a temperature of the machining head 3; a temperature of the optical system that propagates the laser light 19 from the laser apparatus 2 to the machining head 3; a temperature of the driving apparatus 8; a temperature of a structural component that supports the machining head 3 or the driving apparatus 8; a kind, a temperature, and a flow rate of fluids for cooling the component increased in temperature due to laser oscillation; a temperature and humidity of air in the laser apparatus 2; an environmental temperature and humidity around the laser apparatus 2; an actual current of a driving motor of the driving apparatus 8; an output from a position detection unit of the driving apparatus 8; and sizes including a thickness, material quality, specific heat, a density, heat conductivity, a temperature, and a surface state of the workpiece 7.

The optical output emitted from the laser apparatus 2 can be obtained by an output from the output light detection unit 4. However, installation of the output light detection unit 4 is not limited in the machining head 3 as illustrated in FIG. 1. The output light detection unit 4 can be installed in the laser apparatus 2 or in the midway between the laser apparatus 2 and the machining head 3. The output light detection unit 4 may be installed at a place where the amount of laser light 19 combined by the optical coupler is detected. When there are a plurality of independently drivable laser oscillators, output light detection units 4 are preferably provided corresponding to the respective laser oscillators so as to simultaneously measure optical output characteristics of the laser oscillators.

A temperature, humidity and a flow rate of each portion can be observed by a temperature detector, a humidity detector, and a flowmeter. By observing the actual current of the driving motor of the driving apparatus 8 and the output from the position detection unit of the driving apparatus 8, laser machining condition data including driving condition data for performing accurate driving with limited overshooting or the like during rapid acceleration or deceleration can be learned.

Data relating to the sizes including a thickness, material quality, specific heat, a density, heat conductivity and the like of the workpiece 7 may be input with human intervention, or by automatically reading a bar code recording necessary information. The thickness of the workpiece 7 can be automatically measured by a thickness measuring device. The material quality of the workpiece 7 may be estimated by analyzing a plasma light currently engaged in laser machining by a plasma spectrum analyzer.

Heat characteristics of the workpiece 7 such as specific heat, a density, and heat conductivity can be estimated by heating the workpiece in a manner of pulse by the laser beam 19 or the like to observe a change in temperature or a spread of heat by an infrared imaging apparatus or the like. A temperature and surface state of the workpiece 7 can also be observed by the infrared imaging apparatus or the like. In addition, not only the temperature of the workpiece 7 before the start of laser machining but also a temperature of a machined portion currently engaged in laser processing or a temperature of a portion near the machined portion can be obtained as one of the state amounts of the laser machining system 1.

According to the present invention, a difference between machined results caused by a difference between states of the laser machining system 1 can be learned without being overlooked by observing many state amounts representing the states of the laser machining system 1. When the state of the laser machining system 1 changes due to heat generation or the like during the laser machining, substantially optimal laser machining condition data including the change can be output. Thus, a reduction in machining accuracy or machining quality caused by the change of the state of the laser machining system 1 can be prevented.

The laser machining condition data output from the decision-making unit may include at least one of the followings: an optical output, an optical output waveform, beam mode, and a laser wavelength of the laser beam 19 emitted from each laser apparatus 2; a focal distance, an F-value, and a transmittance of the optical system that emits the laser beam 19; a relative positional relationship including a time change between a focus of the laser beam 19 emitted to the workpiece 7 and a machined surface of the workpiece 7; a spot size, a power density, and a power density distribution of the laser beam 19 emitted to the workpiece 7 on the machined surface of the workpiece 7; a relative positional relationship including a time change between the machining head 3 and the workpiece 7; an angle formed between an optical axis of the laser beam 19 and the machined surface of the workpiece 7; a machining speed; and a kind and a flow rate or supply pressure of assist gas.

For the laser wavelength, a wavelength variable laser apparatus 2 may be used. However, there are a plurality of laser apparatuses 2 different in wavelength, and a laser wavelength can be changed by selecting a laser apparatus 2 to be used. A beam mode can be changed by appropriately selecting one from the plurality of laser apparatuses 2 or one from the plurality of machining heads 3, and the beam mode may also be changed by using a mode variable optical system.

Further, based on a change in focal distance of a zoom lens system in the machining head 3, a change in curvature of adaptive optics (AO) or the like, the focal distance or the F-value of the optical system that emits the laser beam 19 can be changed. The relative positional relationship including the time change between the focus of the laser beam 19 emitted to the workpiece 7 and the machined surface of the workpiece 7 can be changed by moving the machining head 3 and by changing the focal distance of the optical system as described above.

The spot size, the power density, and the power density distribution of the laser beam 19 emitted to the workpiece 7 on the machined surface of the workpiece 7 can be changed by changing the beam mode, the focal distance or the F-value of the optical system, or the relative positional relationship between the focus of the laser beam 19 and the machined surface of the workpiece 7 as described above.

The above laser machining condition data is not limited to a time-fixed value, but data changed with time may be employed. For example, as described above, by moving the machining head 3 or based on the change in focal distance of the zoom lens system in the machining head 3, the change in curvature of the adaptive optics (AO) or the like, the laser machining may be performed while changing a distance between the surface of the workpiece to be machined and the focus of the laser beam.

The machining speed representing a time change in the relative positional relationship between the machining head 3 and the workpiece 7 is not limited to a fixed speed, but a machining speed that is a vector accompanied by acceleration may be provided. For example, when machining of a corner portion where a machining direction steeply changes is performed, laser machining condition data including a command to change a machining speed near the corner can be output. By controlling many machining condition parameters, a substantially ideal machined result or a machined result close to a target machined result can be obtained.

The learning apparatus 13 includes a learning model for learning different laser machining condition data based on contents of the laser machining such as cutting, welding, marking, surface modification, additive manufacturing or the like. The learning unit 13 further includes an error calculation unit 15 that calculates a difference between a laser machined result including a machining speed or time expended for predetermined machining obtained by the operation result acquisition unit 12 and a substantially ideal machined result or a target machined result including a machining speed or time expended for predetermined machining set for each laser machining content, and a learning model update unit 16 that updates the learning model according to the difference.

When a reflected light amount detected by the reflected light detection unit 5 and received as one of the outputs from the operation result acquisition unit 12 exceeds a second predetermined level during machining of the workpiece 7 based on given laser machining condition data, the error calculation unit 15 outputs a calculation result indicating that a predetermined difference has occurred between the machined results of the laser machining condition data. Then, the learning model update unit 16 updates the learning model according to the calculation result.

When other machined results are similar, the higher a machining speed or the shorter a machining time for completing a predetermined machining process, the better. Accordingly, the difference between the laser machined result including the machining speed or the time expended for predetermined machining and the substantially ideal machined result or the target machined result set for each laser machining content is calculated, and the learning model is updated so as to reduce the difference. Therefore, irrespective of laser machining contents, for each laser machining content, optimal or substantially optimal laser machining condition data including a machining speed or time expended for predetermined machining can be learned through supervised learning. According to the present invention, an input (laser machining condition data and state amount of laser machining system 1) and an output (machined result of laser machining) can be provided as a pair, and thus the supervised learning is suitable. However, in the present invention, a learning method is not limited to the supervised learning. Other specific learning methods will be described below.

When an error distribution where a machining speed is low or time expended for predetermined machining is long is set large, laser machining condition data with importance given to machining speed is learned. In contrast, when an error distribution where a machining speed is low or time expended for predetermined machining is long is set small, laser machining condition data with importance given to machining quality is learned. Thus, even for the same machining content, a plurality of learning models where an error distribution regarding a machining speed or time expended for predetermined machining varies may be provided.

Further, when the reflected light amount exceeds the second predetermined level, the error calculation unit 15 outputs a calculation result indicating that a predetermined difference has occurred between the machined results of the laser machining condition data. Accordingly, the learning unit 3 can learn laser machining condition data where the reflected light amount does not exceed the second predetermined level.

Figure 3A:
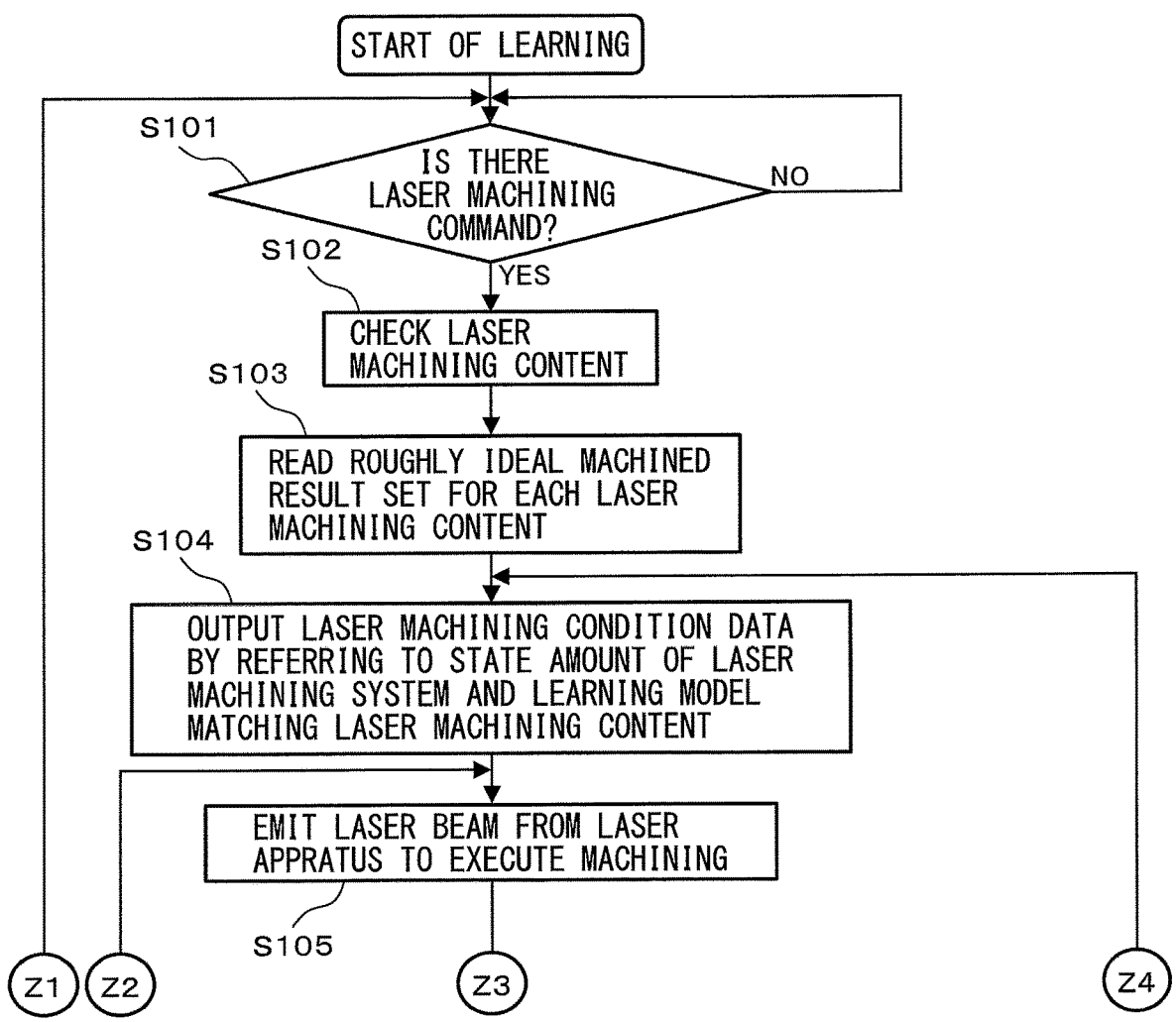
FIG. 3A is a first flow chart illustrating an example of an operation of a machine learning apparatus illustrated in FIG. 1.
Figure 3B:
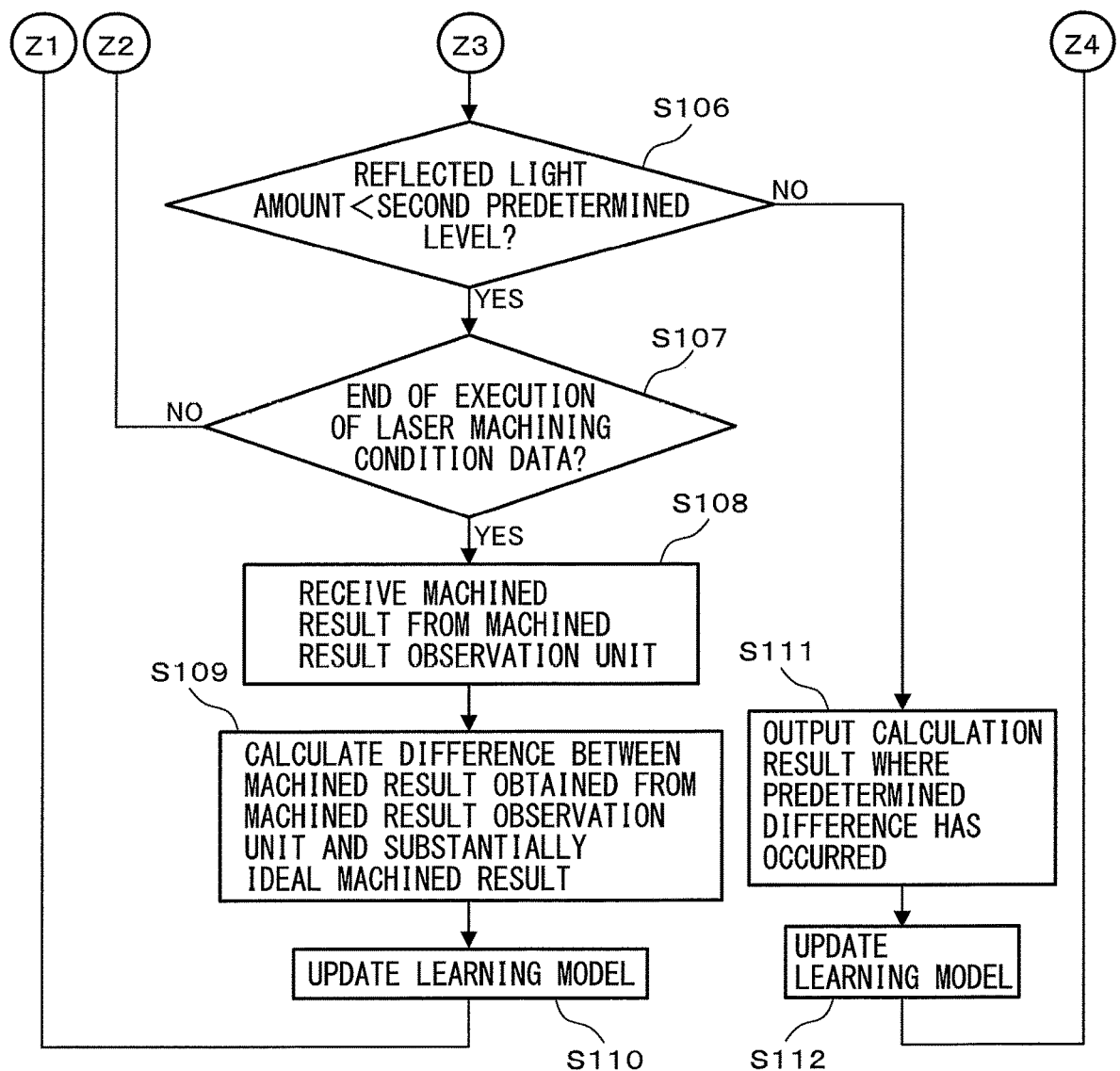
FIG. 3B is a second flow chart illustrating an example of the operation of the machine learning apparatus illustrated in FIG. 1.

Then, an example of an operation of the machine learning apparatus 10 included in the laser machining system 1 according to the present embodiment will be described. FIGS. 3A and 3B are flow charts illustrating an example of the operation of the machine learning apparatus 10 illustrated in FIG. 1.

As illustrated in FIGS. 3A and 3B, in the machine learning apparatus 10 illustrated in FIG. 1, when a learning operation (learning process) is started, first, at step S101, whether there is a laser machining command to the laser machining system 1 is determined. When there is a laser machining command, at step S102, the machine learning apparatus 10 checks a machining content: cutting, welding or the like. Then, at step S103, the machine learning apparatus 10 reads a substantially ideal machined result or a target machined result set for each machining content. At step S104, the machine learning apparatus 10 decides and outputs laser machining condition data by referring to a latest state amount of the laser machining system 1 received from the state amount observation unit 11 and a learning model matching a laser machining content. Then, at step S105, the control apparatus 9 outputs, based on the laser machining condition data, a control signal including an optical output command to the laser apparatus 2 to each portion of the laser machining system 1, and the laser beam 19 is emitted from the laser apparatus 2 to perform laser machining.

At step S106, during the laser machining, as a machined result fed back in real time, a reflected light amount is observed by the reflected light detection unit 5 to monitor that the detected reflected light amount does not exceed the second predetermined level. At step S107, whether execution of the laser machining condition data output from the machine learning unit 13 has been completed is determined, and if not completed, the process returns to step S105 to continuously emit the laser beam 19 until the completion of execution of the laser machining condition data, thereby continuing the laser machining.

In contrast, when it is determined that the execution of the laser machining condition data has been completed, at step S108, a machined result of the laser machining output from the machined result observation unit 6 is received. Then, at step S109, the error calculation unit 15 calculates a difference between a machined result including a machining speed or time expended for predetermined machining obtained from the machined result observation unit 6 and a substantially ideal machined result or a target machined result including a machining speed or time expended for predetermined machining. Subsequently, at step S110, the learning model is updated according to a calculation result of the difference. The process then returns to step S101 to execute the flow of step S101 and after again.

When it is determined at step S106 that the reflected light amount exceeds the second predetermined level, at step S111, a calculation result indicating that a predetermined difference has occurred is output from the error calculation unit 15. At step S112, the learning model is updated according to the difference. Then, the process returns to step S104 to output next laser machining condition data.

By repeating the above process of steps S101 to S112, the learning unit 13 continuously updates the learning model to learn the laser machining condition data. Allowable machining quality may be set instead of the substantially ideal machined result or the target machined result, and no difference may be calculated to be present in machining quality when the machining quality is equal to or higher than the allowable machining quality. Accordingly, laser machining condition data of a machining speed as high as possible can be learned within a range equal to or higher than the allowable machining quality. As described above, the learning model is not limited to one type.

Figure 4:
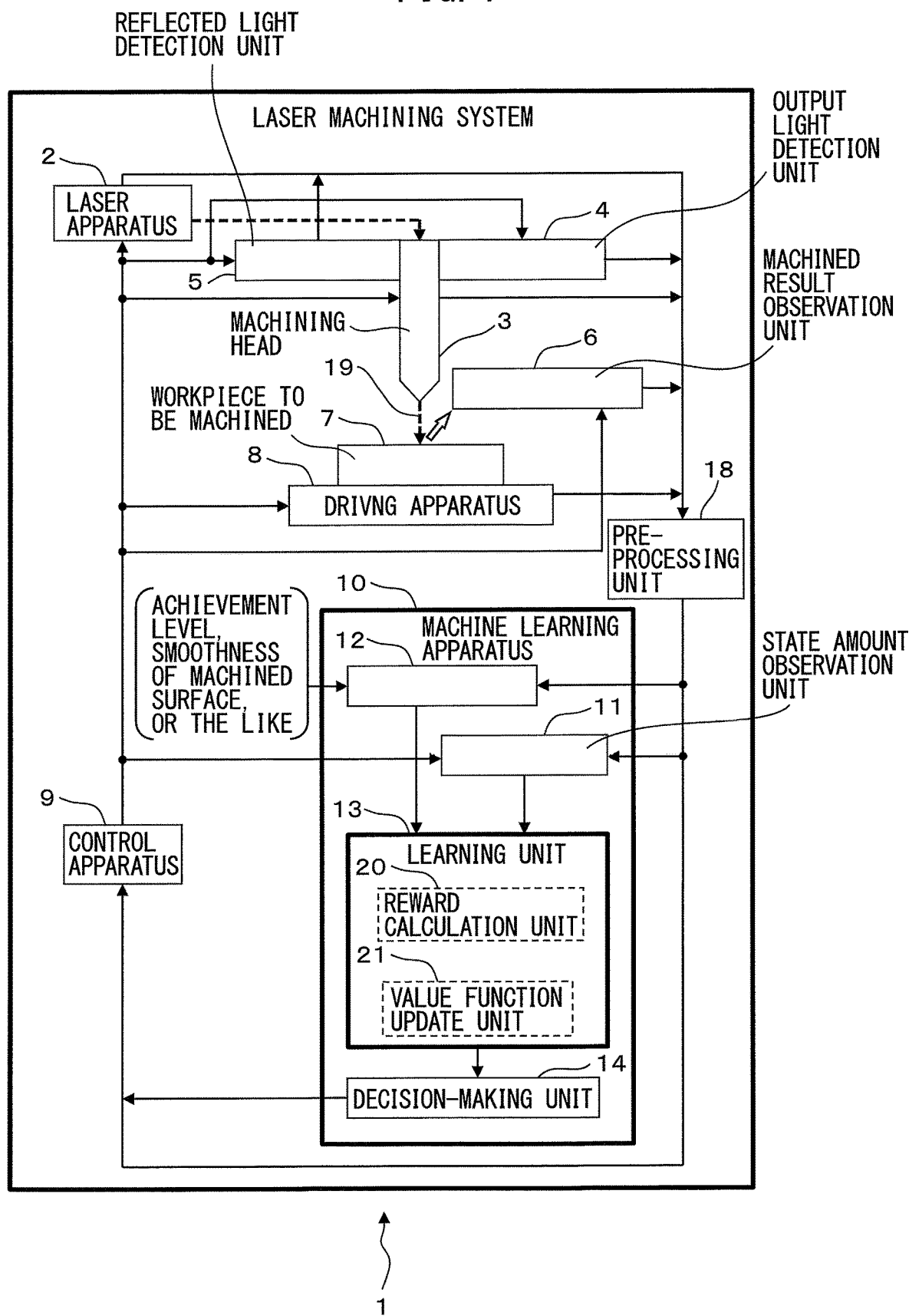
FIG. 4 is a block diagram illustrating a conceptual configuration of a laser machining system according to another embodiment of the present invention.

FIG. 4 is a block diagram illustrating a conceptual configuration of a laser machining system according to another embodiment of the present invention. As illustrated in FIG. 4, a learning unit 13 includes a reward calculation unit 20, and a value function update unit 21 that updates a value function according to a reward. A value function defining a value of laser machining condition data based on a laser machining content such as cutting, welding, marking, surface modification, additive manufacturing or the like is provided in a manner that its content varies from one laser machining content to another.

The reward calculation unit 20 provides, when a difference between a laser machined result including a machining speed or time expended for predetermined machining obtained by an operation result acquisition unit 12 and a substantially ideal machined result or a target machined result including a machining speed or time expended for predetermined machining set for each laser machining content is small, a plus reward according to a small size thereof, and when the difference is large, provides a minus reward according to a large size thereof.

In this case, when a reflected light amount detected by a reflected light detection unit 5 and received as one of outputs from the operation result acquisition unit 12 exceeds a second predetermined level during machining of a workpiece 7 based on given laser machining condition, preferably, the reward calculation unit 20 provides a predetermined minus reward, and the value function update unit 21 updates the value function according to the predetermined minus reward.

FIG. 4 illustrates an example of the laser machining system 1 to which reinforcement learning is applied. As can be understood from comparison with FIG. 1, the laser machining system 1 illustrated in FIG. 4 to which the reinforcement learning is applied does not include a result (label) attached data recording unit 17. A machine learning apparatus 10 in the laser machining system 1 to which the reinforcement learning is applied includes a state amount observation unit 11, an operation result acquisition unit 12, the learning unit 13, and a decision-making unit 14, and the learning unit 13 includes the reward calculation unit 20, and the value function update unit 21.

As in the case of the supervised learning, when other machined results are similar, the higher a machining speed or the shorter machining time for completing a predetermined machining process, the better. Accordingly, when a difference between a laser machined result including a machining speed or time expended for predetermined machining and a substantially ideal machined result or a target machined result including a machining speed or time expended for predetermined machining set for each laser machining content is small, a plus reward is provided according to a small size thereof, and when the difference is large, a minus reward is provided according to a large size thereof. Therefore, irrespective of laser machining contents, for each laser machining content, optimal or substantially optimal laser machining condition data including a machining speed or time expended for predetermined machining can be learned through reinforcement learning.

As described above, as the learning method of the machine learning apparatus 10 according to the present invention, the supervised learning where a great volume of input and output pairs (label attached data) is provided is suited. The reinforcement learning has a feature of discovering unknown learning areas. Accordingly, by performing the reinforcement learning at a sufficiently learned stage, more laser machining conditions suited for target laser machining may be found in hitherto unknown condition areas.

When a large reward is set in the case of a high machining speed or short time expended for predetermined machining, laser machining condition data with importance given to the machining speed is learned. In contrast, when a small minus reward is set in the case of a low machining speed or long time expended for predetermined machining, laser machining condition data with importance given to machining quality is learned. Therefore, even for the same machining content, a plurality of value functions different in reward with respect to the machining speed or the time expended for predetermined machining may be provided.

When the reflected light amount exceeds the second predetermined level, the reward calculation unit 20 provides a predetermined minus reward. Accordingly, the learning unit 13 can learn laser machining condition data where the reflected light amount does not exceed the second predetermined level.

Figure 5A:
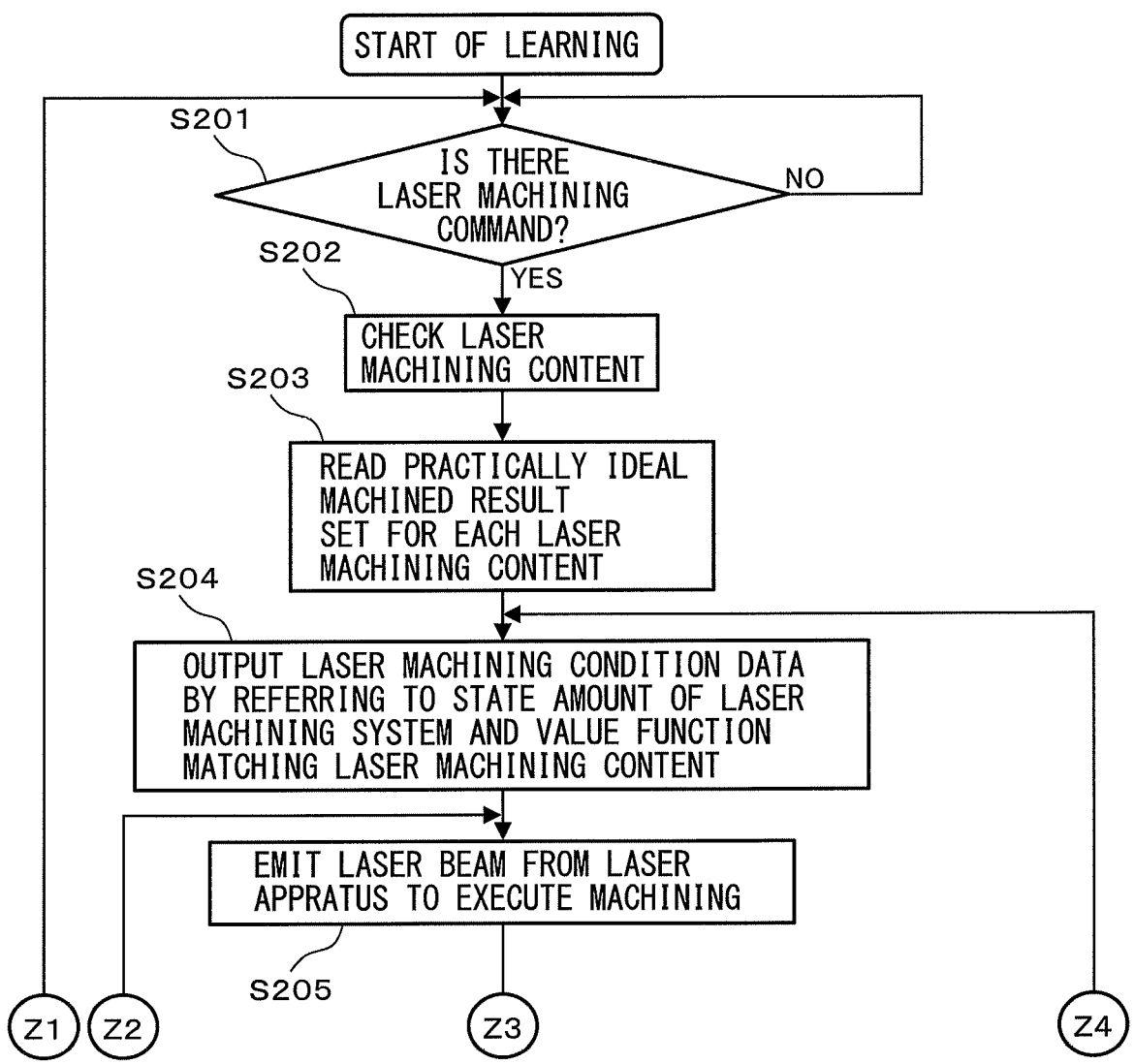
FIG. 5A is a first flow chart illustrating an example of an operation of a machine learning apparatus illustrated in FIG. 4.

FIGS. 5A and 5B are flow charts illustrating an example of the operation of the machine learning apparatus 10 illustrated in FIG. 4. As illustrated in FIGS. 5A and 5B, in the machine learning apparatus 10 illustrated in FIG. 4, when a learning operation (learning process) is started, first, at step S201, whether there is a laser machining command to the laser machining system 1 is determined. When there is a laser machining command, at step S202, the machine learning apparatus 10 checks a machining content: cutting, welding or the like. Then, at step S203, the machine learning apparatus 10 reads a substantially ideal machined result or a target machined result set for each laser machining content. At step S204, the machine learning apparatus 10 decides and outputs laser machining condition data by referring to a latest state amount of the laser machining system 1 received from the state amount observation unit 11 and a value function matching a laser machining content. Then, at step S205, the control apparatus 9 outputs, based on the laser machining condition data, a control signal including an optical output command to the laser apparatus 2 to each portion of the laser machining system 1, and the laser beam 19 is emitted from the laser apparatus 2 to perform laser machining.

At step S206, during the laser machining, as a machined result fed back in real time, a reflected light amount is detected by the reflected light detection unit 5 to monitor whether the detected reflected light amount does not exceed the second predetermined level. At step S207, whether execution of the laser machining condition data output from the machine learning unit 13 has ended is determined. The process returns to step S205 until the end of the laser machining condition data to continuously emit the laser beam 19, thereby continuing the laser machining.

In contrast, when it is determined that the execution of the laser machining condition data has ended, at step S208, a machined result of the laser machining output from the machined result observation unit 6 is received. Then, at step S209, a difference between a laser machined result including a machining speed or time expended for predetermined machining obtained from the machined result observation unit 6 and a substantially ideal machined result or a target machined result including a machining speed or time expended for predetermined machining is determined. Subsequently, at step S210, the reward calculation unit 20 provides, when a difference between a laser machined result including a machining speed or time expended for predetermined machining obtained from the machined result observation unit 6 and a substantially ideal machined result or a target machining result including a machining speed or time expended for predetermined machining is small, a plus reward according to a small size thereof. In contrast, when the difference is large, at step S211, the reward calculation unit 20 provides a minus reward according to a large size thereof. Then, at step S212, the value function update unit 21 updates the value function according to the reward. The process then returns to step S201 to execute the flow of step S201 and after again.

When it is determined at step S206 that the reflected light amount exceeds the second predetermined level, at step S213, the reward calculation unit 20 provides a minus reward. At step S214, the value function update unit 21 updates the value function according to the reward. Then, the process returns to step S204 to output next laser machining condition data.

By repeating the above process of steps S201 to S214, the learning unit 13 continuously updates the value function or an action value table described below to learn the laser machining condition data. Allowable machining quality may be set instead of the substantially ideal machined result or the target machined result, and a certain plus reward may be provided for machining quality when the machining quality is equal to or higher than the allowable machining quality. Accordingly, laser machining condition data of a machining speed as high as possible can be learned within a range equal to or higher than the allowable machining quality. As described above, the value function is not limited to one type.

In the laser machining system 1 that includes the aforementioned machine learning apparatus 10, based on the laser machining condition data output from the machine learning apparatus 10, the control apparatus 9 performs laser machining by controlling the respective portions of the laser machining system 1 such as the laser apparatus 2, the machining head 3, the output light detection unit 4, the reflected light detection unit 5, the machined result observation unit 6, and the driving apparatus 8, in which at least one each is provided. Thus, the laser machining can be performed under a laser machining condition optimal or substantially optimal for obtaining a high-quality and highly accurate machined result at a high speed while preventing the reflected light from damaging the laser apparatus 2, the machining head 3, the laser optical system or the like.

Figure 6:
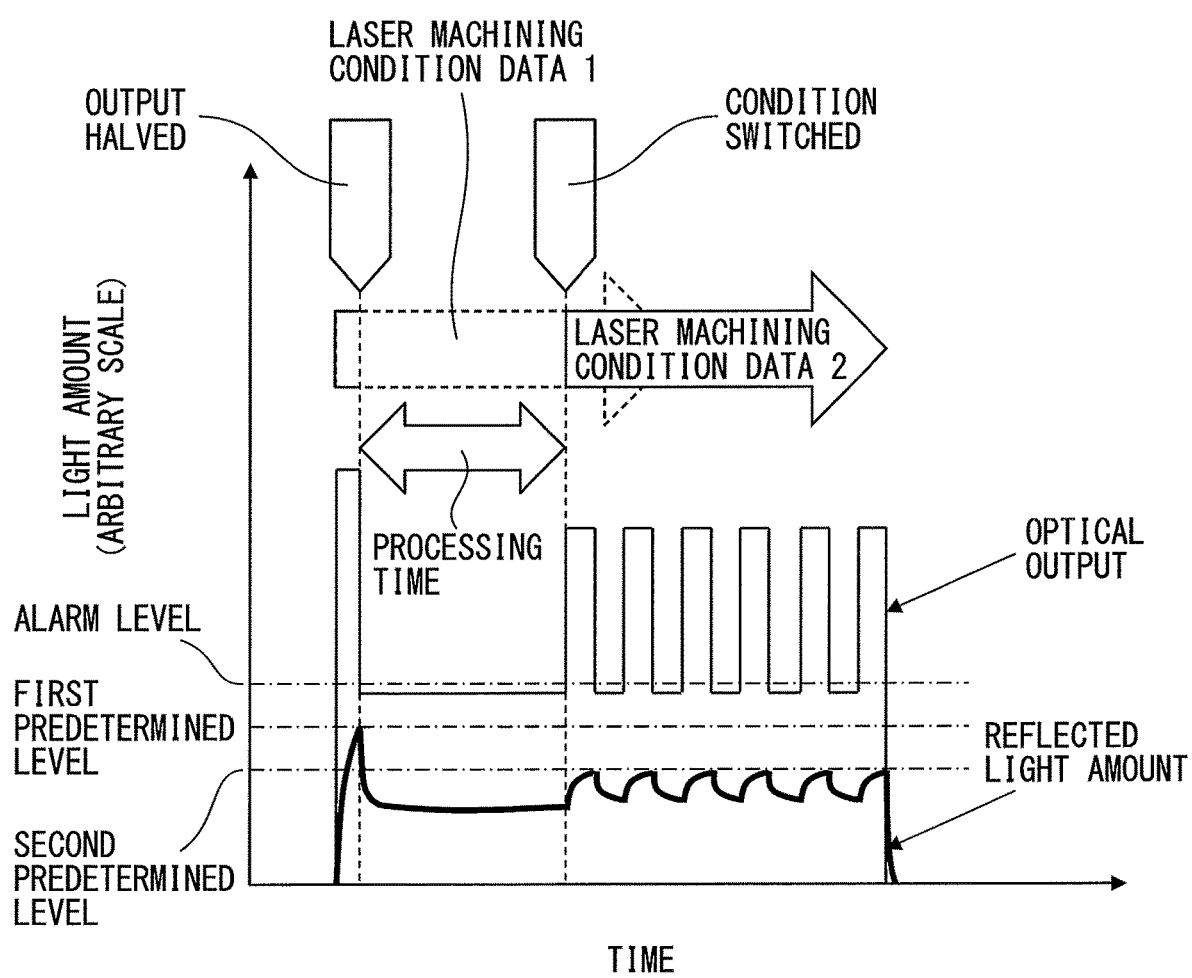
FIG. 6 is a time chart schematically illustrating a state where an optical output is reduced by a control apparatus until laser machining condition data is switched due to a reflected light amount.

Preferably, the laser machining system 1 prevents the reflected light from damaging the laser apparatus 2, the machining head 3, the laser optical system or the like with greater certainty. FIG. 6 is a time chart schematically illustrating a state where an optical output is reduced by the control apparatus until laser machining condition data is switched due to the reflected light amount. As illustrated in FIG. 6, when the reflected light amount detected by the reflected light detection unit 5 exceeds a first predetermined level closer to the alarm level than the second predetermined level, the control apparatus 9 may cut off or reduce to a predetermined ratio the optical output from the laser apparatus 2 without waiting for outputting of next laser machining condition data from the machine learning apparatus 10. Accordingly, even when machining time expended for outputting the next laser machining condition data becomes slightly longer, damaging of the laser apparatus 2 or the like can be prevented with greater certainty.

A plurality of reflected light detection units 5 may be provided. Then, for example, each reflected light detection unit 5 detects an amount of a reflected light of a different propagation path to extract a feature of the reflected light such as a ratio of the reflected light amount. Such a reflected light amount may be fed back to the laser machining condition data via the operation result acquisition unit 12. When the plurality of reflected light detection units 15 is provided, a first predetermined level or a second predetermined level may be set individually for each reflected light detection unit 5.

In the laser machining system 1, optical output characteristics of the laser apparatus 2 indicating a relationship between an optical output command from the control apparatus 9 and an optical output actually emitted from the laser apparatus 2 are stored in the laser apparatus 2 or the control apparatus 9. Preferably, the optical output characteristics are measured along a predetermined schedule, and the optical output characteristics of the laser apparatus 2 are updated based on a measurement result.

The optical output characteristics of the laser apparatus 2 are updated, and a result thereof is stored as a part of the state amount of the laser machining system 1 in the state amount observation unit 11. Accordingly, even when the optical output characteristics of the laser apparatus 2 change due to deterioration or the like, an optical output can be issued as instructed in response to the optical output command. When there is a plurality of laser oscillators as described above, the output light detection unit 4 is installed at a place where the amount of a laser light combined by the optical coupler is detected. When there is a plurality of independently drivable laser oscillators, output light detection units 4 are preferably provided in the respective laser oscillators so as to simultaneously measure optical output characteristics of the laser oscillators.

At least one of the machined result observation units 6 of the laser machining system 1 can be any one of a digital two-dimensional imaging apparatus, a CCD measurement microscope, a contact-type surface roughness/shape measurement apparatus, a white light interferometer, a laser microscope (shape measurement microscope), and a non-contact three-dimensional measurement apparatus. At least one data among smoothness or surface roughness of a laser cut surface, a volume of bead-like deposits (dross) formed on front and rear surfaces near a cut portion per unit cut length, a sputter deposition amount per unit area on the rear surface, a scale (oxide) color density on the cut surface, cutting size/shape accuracy, and observation result data of perpendicularity of the cut surface can be output as the result of the laser machining condition data from the machined result observation unit 6 to the operation result acquisition unit 12.

The above acquisition of the machined result of the laser cutting by the machined result observation unit 6 is normally performed after the end of the laser machining based on the laser machining condition data. For example, the workpiece 7 subjected to laser machining or the measurement apparatus is moved by a robot or the like that is a specific example of the driving apparatus 8, thereby enabling the measurement apparatus to observe a cut surface or the like of the workpiece 7 by the laser machining. Thus, a machined result can be automatically obtained.

Therefore, an evaluation result of machining accuracy, machining quality or the like of the cut surface can be obtained as the result of the laser machining condition data without any human intervention. As a result, the machine learning apparatus 10 can learn the laser machining condition data without any human intervention. However, as described above, human intervention for obtaining the machined result is not totally inhibited.

An observation result of the reflected light amount by the reflected light detection unit 5 can be a machined result of the laser machining condition data obtainable in real time during the laser machining to be fed back via the operation result acquisition unit 12. As observation of an intermediate machined result, a cut line shape immediately after machining may be observed by the digital two-dimensional imaging apparatus, the CCD measurement microscope or the like and, for example, stability of a cut width, machining accuracy of a right-angled cut portion or the like may be obtained as a machined result to be fed back via the operation result acquisition unit 12.

At least one of the machined result observation units 6 of the laser machining system 1 can be any one of the digital two-dimensional imaging apparatus, the CCD measurement microscope, the laser microscope (shape measurement microscope), a light excitation nondestructive inspection apparatus including a light source and an infrared camera, an ultrasonic flaw detection testing apparatus, an induction heating nondestructive inspection apparatus, a radiation transmission imaging apparatus, and an acoustic emission testing apparatus. At least one observation result data among cracks in a welded portion, a blowhole, a pinhole, a lack of penetration, an incomplete fusion, undercut/overlap, and humping caused by the laser, can be output as the result of the laser machining condition data from the machined result observation unit 6 to the operation result acquisition unit 12.

As in the case of the acquisition of the laser cutting result, the acquisition of the machined result of the laser welding by the machined result observation unit 6 is normally performed after the end of the laser machining based on the laser machining condition data. For example, the workpiece 7 subjected to laser machining or the measurement apparatus is moved by a robot or the like that is a specific example of the driving apparatus 8, thereby enabling the measurement apparatus to observe a welded portion or the like by the laser machining. Thus, a machined result can be automatically obtained.

Therefore, an evaluation result of machining accuracy, machining quality or the like of the welded portion can be obtained as the result of the laser machining condition data without any human intervention. As a result, the machine learning apparatus 10 can learn the laser machining condition data without any human intervention. However, as described above, human intervention for obtaining the machined result is not totally inhibited.

An observation result of the reflected light amount by the reflected light detection unit 5 can be a machined result of the laser machining condition data obtainable in real time during the laser machining to be fed back via the operation result acquisition unit 12. As observation of an intermediate machined result, a welded portion shape immediately after machining may be observed by the digital two-dimensional imaging apparatus, the CCD measurement microscope or the like and, for example, observation result data of undercut/overlap, humping or the like may be obtained as a machined result to be fed back via the operation result acquisition unit 12.

In the laser machining system 1 according to the aforementioned embodiment, as illustrated in FIG. 1 or FIG. 4, one machine learning apparatus 10 is provided in one laser machining system 1. However, according to the present invention, the numbers of laser machining systems 1 and machine learning apparatuses 10 are not limited to one each. Preferably, there is a plurality of laser machining systems 1, and a plurality of machine learning apparatuses 10 provided for every laser machining systems 1 share or exchange data with each other via a communication medium. Sharing the data including a learning result obtained by each laser machining system 1 enables a more accurate learning effect to be obtained within a shorter time and more appropriate laser machining condition data to be output.

Further, the machine learning apparatus 10 may be located in the laser machining system 1 or outside the laser machining system 1. A single machine learning apparatus 10 may be shared by a plurality of laser machining systems 1 via the communication medium. The machine learning apparatus 10 may be installed on a cloud server.

As a result, not only the learning effect can be shared, but also the data can be centrally controlled, and learning can be performed by using a large high-performance processor. Thus, a learning speed and learning accuracy can be increased, and more appropriate laser machining condition data can be output. In addition, time for deciding laser machining condition data to be output can be shortened. For such a machine learning apparatus 10, a general-purpose computer or a processor may be used. However, when general-purpose computing on graphics processing units (GPGPU), a large PC cluster or the like is applied, processing can be performed at a higher speed.

Lastly, a learning method of the machine learning apparatus 10 illustrated in FIG. 1 or FIG. 4 will be described. The machine learning apparatus 10 has a function for extracting a useful algorithm, a rule, a knowledge expression, a criterion or the like in a set of data input thereto by analysis, outputting a determination result, and learning knowledge.

Machine learning has algorithms largely classified into "supervised learning", "unsupervised learning" and "reinforcement learning." In addition, to realize these methods, there is a method referred to as "deep learning" for learning extraction of a feature amount itself.

The supervised learning is a learning method for learning, by providing a great amount of sets of given inputs and data of results (labels) to the machine learning apparatus 10, features included in the data sets, and inductively obtaining a model for estimating a result from the input, in other words, a relationship thereof. In the supervised learning, by providing input data and output data appropriate for learning as a pair, the learning can proceed relatively easily.

The unsupervised learning is a method for carrying out learning by an apparatus that learns how input data has been distributed by providing a great amount of only input data to the learning apparatus, and compresses, classifies or shapes the input data without providing any corresponding supervised output data. The unsupervised learning is different from the supervised learning in that "what to be output" is not predetermined. This method is used for extracting an essential structure present behind the data.

The reinforcement learning is a method for learning not only determination and classification but also an action to know an appropriate action with consideration given to interaction imposed on an environment by the action, in other words, a method of learning to maximize a reward obtained in the future. In the reinforcement learning, learning is started from a state where a result of an action is totally unknown or known only incompletely. Pre-learning is carried out in the supervised learning, and then with a pre-learned state set as an initial state, the reinforcement learning can be started from a point of a good condition. The reinforcement learning has a feature of being able to select an action to find unknown learning areas and an action to utilize known learning areas with good balance, and more laser machining conditions suited for target laser machining may be found in hitherto unknown condition areas. In addition, outputting of the laser machining condition data causes a change in temperature of the laser oscillator or the workpiece 7 or the like, in other words, the action affects an environment. Thus, application of the reinforcement learning may be significant.

FIG. 1 illustrates the example of the laser machining system 1 that includes the machine learning apparatus 10 based on the supervised learning, and FIG. 4 illustrates the example of the laser machining system 1 that includes the machine learning apparatus 10 based on the reinforcement learning.

First, the learning method based on the supervised learning will be described. In the supervised learning, a pair of input data and output data appropriate for learning is provided to generate a function (learning model) for mapping the input data and its corresponding output data.

An operation of the machine learning apparatus that carries out the supervised learning includes two stages, namely, a learning stage and a prediction stage. At the learning stage, when supervising data including a value of a state variable (explanation variable) used as input data and a value of a target variable used as output data is provided, the machine learning apparatus that carries out the supervised learning learns outputting of the value of the target variable at the time of inputting of the value of the state variable, and constructs a prediction model for outputting the value of the target variable with respect to the value of the state variable. Then, at the prediction stage, when new input data (state variable) is provided, the machine learning apparatus that carries out the supervised learning predicts and outputs output data (target variable) according to the learning result (constructed prediction model). Here, the result (label) attached data recording unit 17 can hold result (label) attached data obtained thus far, and provide the result (label) attached data to the error calculation unit 15. Alternatively, the result (label) attached data of the laser apparatus 2 can be provided to the error calculation unit 15 of the laser apparatus 2 through a memory card, a communication line or the like.

As an example of learning of the machine learning apparatus that carries out the supervised learning, a regression formula of a prediction model similar to, for example, that of following equation (1) is set, and learning proceeds to adjust values of factors $a_0$, $a_1$, $a_2$, $a_3$, ... so as to obtain a value of a target variable y when values taken by state variables $x_1$, $x_2$, $x_3$, ... during the learning process are applied to the regression formula. The learning method is not limited to this method, but varies from one supervised learning algorithm to another.

$$y = a_0 + a_1 x_1 + a_2 x_2 + a_3 x_3 + \ldots + a_n x_n$$

As supervised learning algorithms, there are known various methods such as a neural network, a least squares method, and a stepwise method, and any of these supervised learning algorithms may be employed as a method applied to the present invention. As each supervised learning algorithm is known, detailed description thereof is omitted herein.

Next, the learning method based on the reinforcement learning will be described. A problem of the reinforcement learning may be set as follows.

The machine learning unit 13 of the laser apparatus 2 observes a state of an environment including a state of the laser apparatus 2 to decide an action (outputting of laser machining condition data).

The environment changes according to a certain algorithm, and the action may give a change to the environment.

A reward signal is returned for each action.

It is the sum of rewards in the future that is desired to be maximized.

Learning is started from a state where a result caused by the action is totally unknown or known only incompletely.

As representative reinforcement learning methods, Q learning and TD learning are known. Hereinafter, the case of the Q learning will be described, but a method is not limited to the Q learning.

The Q learning is a method for learning a value Q (s, a) for selecting an action a under a given environment state s. In the state s, an action a of a highest value Q (s, a) may be selected as an optimal action. However, at first, as a correct value of the value Q (s, a) is not known for a combination of the state s with the action a, an agent (action subject) selects various actions a under the state s, and is given rewards for the actions a at the time. This way, the agent selects a better action, in other words, learns a correct value Q (s, a).

Further, with a view to maximizing the sum of rewards obtained in the future as a result of the action, Q (s, a)=$E[\Sigma(\gamma_t)r^t]$ may be finally achieved. "E[ ]" represents an expected value, t represents time, $\gamma$ represents a parameter referred to as a discount rate described below, $r_t$ represents a reward at the time t, and $\Sigma$ represents the sum at the time t. The expected value in this formula is taken when a state changes according to the optimal action, and learned through searching as it is not known. An update formula for such a value Q (s, a) can, for example, be represented by equation (2) described below.

In other words, the value function update unit 21 updates a value function Q ($s_t$, $a_t$) by using the following equation (2):

$$Q(s_t, a_t) \leftarrow Q(s_t, a_t) + \alpha\left(r_{t+1} + \gamma \max_a Q(s_{t+1}, a) - Q(s_t, a_t)\right)$$

In the above equation, $s_t$ represents a state of the environment at the time t, and $a_t$ represents an action at the time t. The action $a_t$ changes the state to $s_{t+1}$. $r_{t+1}$ represents a reward that can be obtained via the change of the state. Further, a term with max is a Q value multiplied by $\gamma$ for a case where the action a for the highest Q value known at that time is selected under the state $s_{t+1}$. $\gamma$ is a parameter of $0<\gamma\leq1$, and referred to as a discount rate. $\alpha$ is a learning factor, which is in the range of $0<\alpha\leq1$.

The equation (2) represents a method for updating an evaluation value Q ($s_t$, $a_t$) of the action $a_t$ in the state $s_t$ on the basis of the reward $r_{t+1}$ returned as a result of the action $a_t$. It indicates that when the sum of a reward $r_{t+1}$ and an evaluation value Q ($s_{t+1}$, max $a_{t+1}$) of the best action max a in the next state based on action a is larger than the evaluation value Q ($s_t$, $a_t$) of the action a in the state s, Q ($s_t$, $a_t$) is increased, whereas when smaller, Q ($s_t$, $a_t$) is decreased. In other words, it is configured such that the value of some action in some state is made to be closer to the reward that instantly comes back as a result and to the value of the best action in the next state based on that action. Methods of representing Q (s, a) on a computer include a method in which the value is retained as an action value table for all state-action pairs (s, a) and a method in which a function approximate to Q (s, a) is prepared. In the latter method, the abovementioned equation (2) can be implemented by adjusting parameters of the approximation function by a technique, such as stochastic gradient descent method. The approximation function may use a neural network.

As described above, as the learning algorithm of the supervised learning or as the approximation algorithm of the value function in the reinforcement learning, the neural network can be used. Thus, the machine learning apparatus 10 6 preferably has the neural network.

Figure 7:
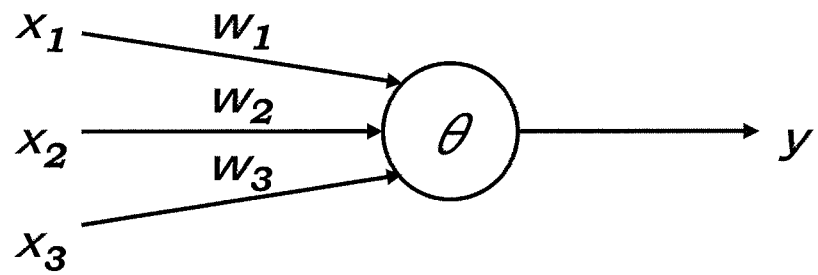
FIG. 7 is a diagram schematically illustrating a model of neurons.
Figure 8:
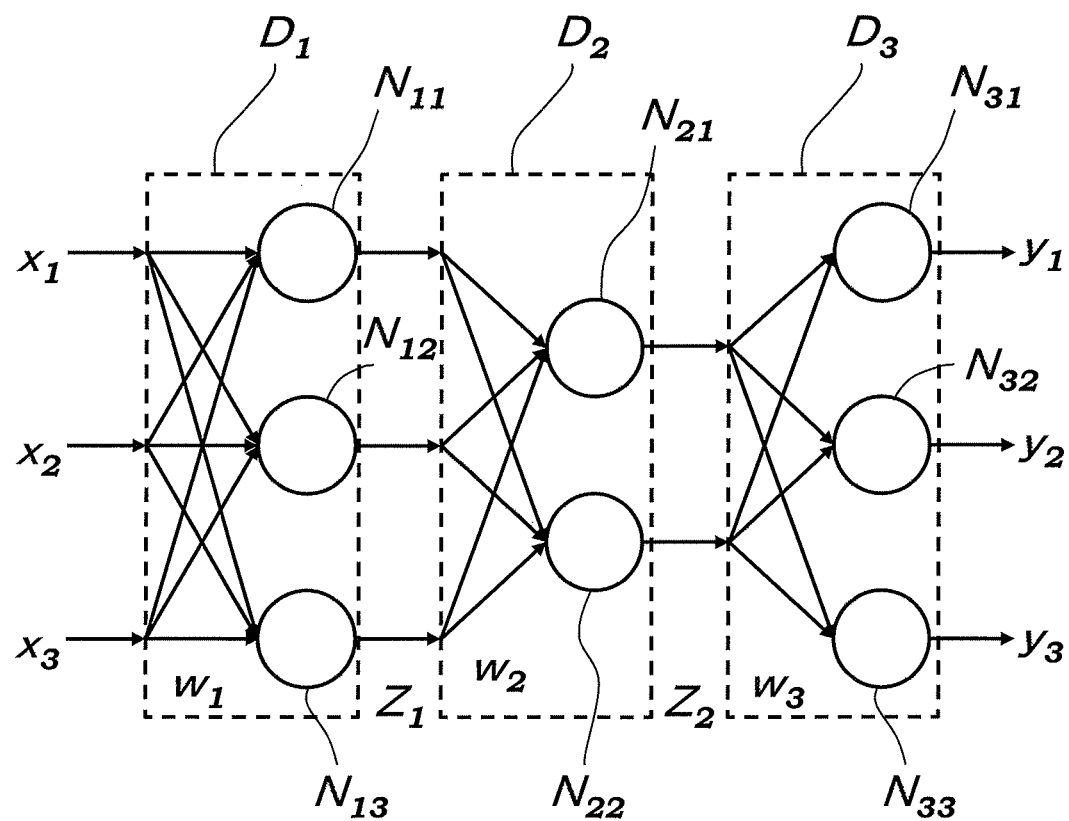
FIG. 8 is a diagram schematically illustrating a three-layer neural network configured by combining the neurons illustrated in FIG. 7.

FIG. 7 schematically illustrates a neuron model, and FIG. 8 schematically illustrates a three-layer neural network configured by combining neurons illustrated in FIG. 7. The neuron network includes an arithmetic unit, a memory, or the like that imitates a neuron model such as that illustrated in FIG. 7. The neuron outputs an output (result) y for a plurality of inputs x. Each input x ($x_1$ to $x_3$) is multiplied by a weight w ($w_1$ to $w_3$) corresponding to the input x. The neuron outputs the output y represented by following equation (3). The input x, the output y, and the weight w all are vectors.

$$y = f_k\left(\sum_{i=1}^{n} x_i w_i - \theta\right)$$

where $\theta$ is a bias, and $f_k$ is an activation function.

As illustrated in FIG. 8, a plurality of inputs x ($x_1$ to $x_3$) is input from the left side of the neural network, and a result y ($y_1$ to $y_3$) is output from the right side. The inputs $x_1$ to $x_3$ are multiplied by corresponding weights and input to the three neurons $N_{11}$ to $N_{13}$. The weights applied to these inputs are collectively indicated by w1.

The neurons $N_{11}$ to $N_{13}$ output $z_{11}$ to $z_{13}$, respectively. In FIG. 8, $z_{11}$ to $z_{13}$ are collectively represented as a feature vector $z_1$, and can be regarded as a vector obtained by extracting the feature amounts of the input vector. The feature vector $z_1$ is a feature vector between the weight $w_1$ and the weight $w_2$. The feature vectors $z_{11}$ to $z_{13}$ are multiplied by a corresponding weight and input to each of the two neurons $N_{21}$ and $N_{22}$. The weights applied to these feature vectors are collectively represented as w2. The neurons $N_{21}$ and $N_{22}$ output $z_{21}$ and $z_{22}$, respectively. In FIG. 8, $z_{21}$ and $z_{22}$ are collectively represented as a feature vector $z_2$. The feature vector $z_2$ is a feature vector between the weight $w_2$ and the weight w3. The feature vectors $z_{21}$ and $z_{22}$ are multiplied by a corresponding weight and input to each of the three neurons $N_{31}$ to $N_{33}$. The weights multiplied to these feature vectors are collectively represented as $w_3$.

Finally, the neurons $N_{31}$ to $N_{33}$ output results $y_1$ to $y_3$, respectively. An operation of the neural network includes a learning mode and a value prediction mode: in the learning mode, the weight w is learned by using a learning data set, and in the prediction mode, an action of outputting LDU driving condition data is determined by using parameters thereof. Here, the apparatus can be actually operated in the prediction mode to output the laser machining condition data and instantly learn and cause the resulting data to be reflected in the subsequent action (on-line learning), and a group of pre-collected data can be used to perform collective learning and implement a detection mode with the parameter subsequently for quite a while (batch learning). An intermediate case is also possible, where a learning mode is introduced each time data is accumulated to a certain degree.

The weights $w_1$ to $w_3$ can be learned by a backpropagation. Error information enters from the right side and flows to the left side. The backpropagation is a technique for adjusting (learning) each weight so as to minimize a difference between an output y when an input x is input and a true output y (teacher) for each neuron.

The number of intermediate layers (hidden layers) of the neural network illustrated in FIG. 8 is one. However, the neural network can increase the layers to two or more, and when the number of intermediate layers is two or more, it is referred to as deep learning.

The application of the supervised learning and the reinforcement learning has been described. However, the machine learning method applied to the present invention is not limited to these methods. Various methods such as "supervised learning", "unsupervised learning", and "half-supervised learning", and "reinforcement learning" usable in the machine learning apparatus 10 can be applied.

Effects of Invention

According to the first aspect of the present invention, the laser machining condition data is learned in association with the state amount of the laser machining system and the machined result output from the machined result observation unit. Thus, without any human intervention or with minimum human intervention, machining can be performed always under a substantially optimal laser machining condition irrespective of a state of the laser machining system. This enables a high-quality machined result to be stably obtained. The state amounts of the laser machining system include a state amount changed during the laser machining due to emission of the laser beam.

According to the second aspect of the present invention, before the level of the reflected light reaches the alarm level, the current condition is changed to a condition where the reflected light is reduced and the substantially similar machined result is predicted to be obtained by referring to the learning result of the learning unit. Thus, the machining can be continued while preventing damaging of the laser apparatus, the machining head or the like.

According to the third aspect of the present invention, the difference between the machined results caused by the difference between the states of the laser machining system can be learned without being overlooked by observing many state amounts representing the states of the laser machining system. Even when the state of the laser machining system changes due to heat generation or the like during the laser machining, the substantially optimal laser machining condition data including the change can be output. Thus, a reduction in machining accuracy or machining quality can be prevented.

According to the fourth aspect of the present invention, by controlling many machining condition parameters, the substantially ideal machined result or the machined result close to the target machined result can be obtained. In order to obtain the substantially ideal machined result or the machined result close to the target machined result, the laser machining condition data may include a command to select an optimal laser apparatus or machining head among a plurality of laser apparatuses or machining heads different in wavelength or beam mode.

According to the fifth aspect of the present invention, as a result of the machine learning, irrespective of a content of laser machining, substantially optimal laser machining condition data including a machining speed can be output with each content of laser machining. The contents of laser machining may be cutting, welding, marking, surface modification, additive manufacturing and the like.

According to the sixth aspect of the present invention, the learning unit can learn the laser machining condition data where the reflected light amount does not exceed the second predetermined level by the supervised learning.

According to the seventh aspect of the present invention, the reinforcement learning is carried out after the pre-learning is sufficiently performed by using the supervised learning. As the reinforcement learning has the feature of being able to find unknown learning areas, more laser machining conditions suited for target laser machining may be found in hitherto unknown condition areas. The contents of laser machining may be cutting, welding, marking, surface modification, additive manufacturing and the like.

According to the eighth aspect of the present invention, the learning unit can learn the laser machining condition data where the reflected light amount does not exceed the second predetermined level by the reinforcement learning.

According to the ninth aspect of the present invention, the laser machining system that includes the machine learning apparatus can carry out the laser machining under the optimal laser machining condition while preventing damaging of the laser apparatus, the machining head, the laser optical system or the like.

According to the tenth aspect of the present invention, when the reflected light amount exceeds the first predetermined level closer to the alarm level, the optical output is immediately cut off or reduced to the predetermined ratio before next laser machining condition data replacing the laser machining condition data is output from the machine learning apparatus. Thus, damaging of the laser apparatus or the like can be prevented.

According to the eleventh aspect of the present invention, the optical output characteristics are updated, and the result thereof is stored as a part of the state amount of the laser machining system in the state amount observation unit. Thus, even when the optical output characteristics change due to deterioration or the like of the laser apparatus, the optical output can be issued as instructed in response to the optical output command.

According to the twelfth aspect of the present invention, the evaluation result of machining accuracy, machining quality or the like of the cut surface can be obtained as the result of the laser machining condition data without any human intervention, and the machine learning apparatus can learn the laser machining condition data without any human intervention.

According to the thirteenth aspect of the present invention, the evaluation result of machining accuracy, machining quality or the like of the welded portion can be obtained as the result of the laser machining condition data without any human intervention, and the machine learning apparatus can learn the laser machining condition data without any human intervention.

According to the fourteenth aspect of the present invention, sharing the data including the learning result obtained by each laser machining system enables a more accurate learning effect to be obtained within a shorter time. Thus, the plurality of laser machining systems can output more appropriate laser machining condition data.

According to the fifteenth aspect of the present invention, not only the learning effect can be shared, but also the data can be centrally controlled, and learning can be performed by using a large high-performance processor. Thus, a learning speed and learning accuracy can be increased, and more appropriate laser machining condition data can be output. In addition, time for deciding laser machining condition data to be output can be shortened. The machine learning apparatus may be installed on a cloud server.

According to the sixteenth aspect of the present invention, the laser machining condition data is learned in association with the state amounts of the laser machining system including the state amount of the laser machining system changed during the laser machining due to emission of the laser beam and the machined result output from the machined result observation unit. Thus, without any human intervention or with minimum human intervention, machining can be performed always under a substantially optimal laser machining condition irrespective of a state of the laser machining system. This enables a high-quality machined result to be stably obtained.

The exemplary embodiments of the present invention have been described. As obvious to those skilled in the art, various changes, omissions and additions can be made without departing from the scope and the spirit of the present invention.

The invention claimed is:

1. A machine learning apparatus for learning laser processing condition data of a laser processing system,
   the laser processing system comprising:
   at least one laser apparatus that includes at least one laser oscillator;
   at least one processing head that emits a laser light from the laser apparatus to a workpiece;
   at least one output light detection unit that detects an amount of the laser light emitted from the processing head;
   at least one reflected light detection unit that detects a reflected light emitted from the processing head and reflected on a surface or near the surface of the workpiece to return to the laser apparatus via an optical system in the processing head;
   at least one processing result observation unit that observes, without human intervention, at least one of a processing state and a processing result of the workpiece at least during laser processing or after the laser processing; and
   at least one driving apparatus that changes a relative positional relationship between the processing head and the workpiece,
   the machine learning apparatus comprising:
   a state amount observation unit that observes a state amount of the laser processing system;
   an operation result acquisition unit that acquires a processing result of the laser processing system;
   learning unit that receives an output from the state amount observation unit and an output from the operation result acquisition unit, and learns the laser processing condition data in association with the state amount of the laser processing system and the processing result; and
   a decision-making unit that outputs laser processing condition data by referring to the laser processing condition data leaned by the learning unit; wherein
   when during processing of the workpiece based on given laser processing condition data, an amount of the reflected light detected by the reflected light detection unit exceeds a second predetermined level set lower than a first predetermined level set lower than an alarm level indicating that at least one of the processing head, the laser apparatus, and a laser light propagation optical component between the processing head and the laser apparatus may be damaged by the reflected light,
   the learning unit refers to the learned laser processing condition data to output laser processing condition data enabling a processing result close to a processing result of the given laser processing condition data to be predicted without the amount of the reflected light detected by the reflected light detection unit exceeding the second predetermined level; and
   the learning unit includes:
   a learning model for learning laser processing condition data varied from one laser processing content to another;
   an error calculation unit that calculates a difference between a laser processing result including a processing speed obtained by the operation result acquisition unit or time expended for predetermined processing and a roughly ideal processing result including a processing speed set for each laser processing content or time expended for predetermined processing or a target processing result; and a learning model update unit that updates the learning model according to the difference.

2. The machine learning apparatus according to claim 1, wherein the state amount observed by the state amount observation unit includes at least one of the followings: light output characteristics of the laser apparatus indicating a relationship between a light output command for the laser apparatus and a light output actually emitted from the laser apparatus; a light output emitted from the laser apparatus; a ratio of a light output emitted from the processing head to the light output from the laser apparatus; a temperature of a portion thermally connected to the laser oscillator; temperatures of portions including a component changed in temperature due to laser oscillation in the laser apparatus; a temperature of the processing head; a temperature of the optical system that propagates the laser light from the laser apparatus to the processing head; a temperature of the driving apparatus; a temperature of a structural component that supports the processing head or the driving apparatus; a type, a temperature, and a flow rate of fluids for cooling the component increased in temperature due to the laser oscillation; a temperature and humidity of air in the laser apparatus; an environmental temperature and humidity around the laser apparatus; an actual current of a driving motor of the driving apparatus; an output from a position detection unit of the driving apparatus; and sizes including a thickness, material quality, specific heat, a density, heat conductivity, a temperature, and a surface state of the workpiece.

3. The machine learning apparatus according to claim 1, wherein the laser processing condition data output from the decision-making unit includes at least one of the followings: a light output, a light output waveform, beam mode, and a laser wavelength of the laser light emitted from each laser apparatus; a focal distance, an F-value, and a transmittance of the optical system that emits the laser light; a relative positional relationship including a time change between a focus of the laser light emitted to the workpiece and a processed surface of the workpiece; a spot size, a power density, and a power density distribution of the laser light emitted to the workpiece on the processed surface of the workpiece; a relative positional relationship including a time change between the processing head and the workpiece; an angle formed between an optical axis of the laser light and the processed surface of the workpiece; a processing speed; and a type and a flow rate or supply pressure of assist gas.

4. A machine learning apparatus for learning laser processing condition data of a laser processing system, the laser processing system comprising:
at least one laser apparatus that includes at least one laser oscillator;
at least one processing head that emits a laser light from the laser apparatus to a workpiece;
at least one output light detection unit that detects an amount of the laser light emitted from the processing head;
at least one reflected light detection unit that detects a reflected light emitted from the processing head and reflected on a surface or near the surface of the workpiece to return to the laser apparatus via an optical system in the processing head;
at least one processing result observation unit that observes, without human intervention, at least one of a processing state and a processing result of the workpiece at least during laser processing or after the laser processing; and
at least one driving apparatus that changes a relative positional relationship between the processing head and the workpiece,
the machine learning apparatus comprising:
a state amount observation unit that observes a state amount of the laser processing system;
an operation result acquisition unit that acquires a processing result of the laser processing system;
a learning unit that receives an output from the state amount observation unit and an output from the operation result acquisition unit, and learns the laser processing condition data in association with the state amount of the laser processing system and the processing result; and
a decision-making unit that outputs laser processing condition data by referring to the laser processing condition data leaned by the learning unit; wherein
when during processing of the workpiece based on given laser processing condition data, an amount of the reflected light detected by the reflected light detection unit exceeds a second predetermined level set lower than a first predetermined level set lower than an alarm level indicating that at least one of the processing head, the laser apparatus, and a laser light propagation optical component between the processing head and the laser apparatus may be damaged by the reflected light,
the learning unit refers to the learned laser processing condition data to output laser processing condition data enabling a processing result close to a processing result of the given laser processing condition data to be predicted without the amount of the reflected light detected by the reflected light detection unit exceeding the second predetermined level;
the learning unit has a value function varied from one laser processing content to another and defining a value of laser processing condition data;
the learning unit further includes a reward calculation unit that provides, when a difference between a laser processing result including a processing speed obtained by the operation result acquisition unit or time expended for predetermined processing and a roughly ideal processing result including a processing speed set for each laser processing content or time expended for predetermined processing or a target processing result is small, a plus reward according to the difference, and when the difference is large, provides a minus reward according to the difference; and
a value function update unit that updates the value function according to the reward; and
in the learning unit, the reward calculation unit provides a predetermined minus reward when the amount of the reflected light detected by the reflected light detection unit exceeds the second predetermined level during the processing of the workpiece based on the given laser processing condition, and the value function is updated according to the predetermined minus reward.

5. A laser processing system provided with a machine learning apparatus for learning laser processing condition data of the laser processing system, the laser processing system comprising:
at least one laser apparatus that includes at least one laser oscillator;
at least one processing head that emits a laser light from the laser apparatus to a workpiece;

at least one output light detection unit that detects an amount of the laser light emitted from the processing head;

at least one reflected light detection unit that detects a reflected light emitted from the processing head and reflected on a surface or near the surface of the workpiece to return to the laser apparatus via an optical system in the processing head;

at least one processing result observation unit that observes, without human intervention, at least one of a processing state and a processing result of the workpiece at least during laser processing or after the laser processing; and at least one driving apparatus that changes a relative positional relationship between the processing head and the workpiece, the machine learning apparatus comprising:

a state amount observation unit that observes a state amount of the laser processing system;

an operation result acquisition unit that acquires a processing result of the laser processing system;

a learning unit that receives an output from the state amount observation unit and an output from the operation result acquisition unit, and learns the laser processing condition data in association with the state amount of the laser processing system and the processing result; and a decision-making unit that outputs laser processing condition data by referring to the laser processing condition data leaned by the learning unit;

the laser processing system further comprising:

at least one control apparatus that controls the laser apparatus, the processing head, the output light detection unit, the reflected light detection unit, the processing result observation unit, and the driving apparatus; wherein when the amount of the reflected light detected by the reflected light detection unit exceeds a first predetermined level, the control apparatus cuts off or reduces the light output from the laser apparatus to a predetermined ratio without waiting for outputting of next laser processing condition data from the machine learning apparatus.

6. The laser processing system according to claim 5, wherein when during processing of the workpiece based on given laser processing condition data, an amount of the reflected light detected by the reflected light detection unit exceeds a second predetermined level set lower than a first predetermined level set lower than an alarm level indicating that at least one of the processing head, the laser apparatus, and a laser light propagation optical component between the processing head and the laser apparatus may be damaged by the reflected light, the learning unit refers to the learned laser processing condition data to output laser processing condition data enabling a processing result close to a processing result of the given laser processing condition data to be predicted without the amount of the reflected light detected by the reflected light detection unit exceeding the second predetermined level.

7. The laser processing system according to claim 5, wherein the state amount observed by the state amount observation unit includes at least one of the followings: light output characteristics of the laser apparatus indicating a relationship between a light output command for the laser apparatus and a light output actually emitted from the laser apparatus; a light output emitted from the laser apparatus; a ratio of a light output emitted from the processing head to the light output from the laser apparatus; a temperature of a portion thermally connected to the laser oscillator; temperatures of portions including a component changed in temperature due to laser oscillation in the laser apparatus; a temperature of the processing head; a temperature of the optical system that propagates the laser light from the laser apparatus to the processing head; a temperature of the driving apparatus; a temperature of a structural component that supports the processing head or the driving apparatus; a type, a temperature, and a flow rate of fluids for cooling the component increased in temperature due to the laser oscillation; a temperature and humidity of air in the laser apparatus; an environmental temperature and humidity around the laser apparatus; an actual current of a driving motor of the driving apparatus; an output from a position detection unit of the driving apparatus; and sizes including a thickness, material quality, specific heat, a density, heat conductivity, a temperature, and a surface state of the workpiece.

8. The laser processing system according to claim 5, wherein the laser processing condition data output from the decision-making unit includes at least one of the followings: a light output, a light output waveform, beam mode, and a laser wavelength of the laser light emitted from each laser apparatus; a focal distance, an F-value, and a transmittance of the optical system that emits the laser light; a relative positional relationship including a time change between a focus of the laser light emitted to the workpiece and a processed surface of the workpiece; a spot size, a power density, and a power density distribution of the laser light emitted to the workpiece on the processed surface of the workpiece; a relative positional relationship including a time change between the processing head and the workpiece; an angle formed between an optical axis of the laser light and the processed surface of the workpiece; a processing speed; and a type and a flow rate or supply pressure of assist gas.

9. The laser processing system according to claim 6, wherein the learning unit includes:

a learning model for learning laser processing condition data varied from one laser processing content to another;

an error calculation unit that calculates a difference between a laser processing result including a processing speed obtained by the operation result acquisition unit or time expended for predetermined processing and a roughly ideal processing result including a processing speed set for each laser processing content or time expended for predetermined processing or a target processing result; and a learning model update unit that updates the learning model according to the difference.

10. The laser processing system according to claim 9, wherein in the learning unit, the error calculation unit outputs, when the amount of the reflected light detected by the reflected light detection unit exceeds the second predetermined level during the processing of the workpiece based on the given laser processing condition data, a calculation result indicating that a predetermined difference has occurred between the processing results of the laser processing condition data, and the learning model is updated according to the calculation result.

11. The laser processing system according to claim 6, wherein the learning unit has a value function varied from one laser processing content to another and defining a value of laser processing condition data, and further includes:

a reward calculation unit that provides, when a difference between a laser processing result including a processing speed obtained by the operation result acquisition unit or time expended for predetermined processing and a roughly ideal processing result including a processing speed set for each laser processing content or time expended for predetermined processing or a target processing result is small, a plus reward according to the difference, and when the difference is large, provides a minus reward according to the difference; and
a value function update unit that updates the value function according to the reward.

12. The laser processing system according to claim 11, wherein in the learning unit, the reward calculation unit provides a predetermined minus reward when the amount of the reflected light detected by the reflected light detection unit exceeds the second predetermined level during the processing of the workpiece based on the given laser processing condition, and the value function is updated according to the predetermined minus reward.

13. The laser processing system according to claim 5, wherein
light output characteristics of the laser apparatus indicating a relationship between a light output command from the control apparatus and a light output actually emitted from the laser apparatus are stored in the laser apparatus or the control apparatus; and
the light output characteristics are measured along a predetermined schedule, and the light output characteristics of the laser apparatus are updated based on a measurement result.

14. The laser processing system according to claim 5, wherein
at least one of the processing result observation units is any one of a digital two-dimensional imaging apparatus, a CCD measurement microscope, a contact-type surface roughness/shape measurement apparatus, a white interferometer, a laser microscope, and a non-contact three-dimensional measurement apparatus; and
at least one data among smoothness or surface roughness of a laser cut surface, a volume of bead-like deposits formed on front and rear surfaces near a cut portion per unit cut length, a sputter deposition amount per unit area on the rear surface, an oxide color density on the cut surface, cutting size/shape accuracy, and observation result data of perpendicularity of the cut surface is output as the result of the laser processing condition data from the processing result observation unit to the operation result acquisition unit.

15. The laser processing system according to claim 5, wherein
at least one of the processing result observation units is any one of a digital two-dimensional imaging apparatus, a CCD measurement microscope, a laser microscope, a light excitation nondestructive inspection apparatus including a light source and an infrared camera, an ultrasonic flaw testing apparatus, an induction heating nondestructive inspection apparatus, a radiation transmission imaging apparatus, and an acoustic emission testing apparatus; and
at least one data among a crack of a welded portion caused by the laser, a blow hole, a pin hole, a welding failure, a fusion failure, undercutting/overcutting, and observation result data of humping is output as the result of the laser processing condition data from the processing result observation unit to the operation result acquisition unit.

16. The laser processing system according to claim 5, wherein a plurality of laser apparatuses is present, and a plurality of machine learning apparatuses installed in the respective laser processing systems share or exchange data with each other via a communication medium.

17. The laser processing system according to 16, wherein the machine learning apparatus is shared by the plurality of laser processing systems via the communication medium.

18. A machine learning method for learning laser processing condition data output to a control apparatus of a laser processing system, comprising:
observing, without human intervention, a state amount of the laser processing system including output data from at least one laser apparatus, output data from at least one processing head, and output data from at least one driving apparatus for changing a relative positional relationship between the processing head and a workpiece; and
receiving, as results of laser processing condition data, output data from at least one reflected light detection unit that detects a reflected light returning to the laser apparatus, and output data from at least one processing result observation unit that observes at least one of a processing state and a processing result of the workpiece at least during laser processing or after an end of the laser processing; wherein
a learning unit learns the laser processing condition data in association with the state amount of the laser processing system and the results of the laser processing condition data;
when during processing of the workpiece based on given laser processing condition data, an amount of the reflected light detected by the reflected light detection unit exceeds a second predetermined level set lower than a first predetermined level set lower than an alarm level indicating that at least one of the processing head, the laser apparatus, and a laser light propagation optical component between the processing head and the laser apparatus may be damaged by the reflected light,
the learning unit refers to the learned laser processing condition data to output laser processing condition data enabling a processing result close to a processing result of the given laser processing condition data to be predicted without the amount of the reflected light detected by the reflected light detection unit exceeding the second predetermined level; and
the learning unit includes a learning model for learning laser processing condition data varied from one laser processing content to another; the method further comprising:
calculating a difference between a laser processing result including a processing speed obtained by an operation result acquisition unit or time expended for predetermined processing and a roughly ideal processing result including a processing speed set for each laser processing content or time expended for predetermined processing or a target processing result; and
updating the learning model according to the difference; wherein
in the learning unit, an error calculation unit outputs, when the amount of the reflected light detected by the reflected light detection unit exceeds the second predetermined level during the processing of the workpiece based on the given laser processing condition data, a calculation result indicating that a predetermined difference has occurred between the processing results of the laser processing condition data, and the learning model is updated according to the calculation result.

19. A machine learning method for learning laser processing condition data output to a control apparatus of a laser processing system, comprising:
- observing, without human intervention, a state amount of the laser processing system including output data from at least one laser apparatus, output data from at least one processing head, and output data from at least one driving apparatus for changing a relative positional relationship between the processing head and a workpiece; and
- receiving, as results of laser processing condition data, output data from at least one reflected light detection unit that detects a reflected light returning to the laser apparatus, and output data from at least one processing result observation unit that observes at least one of a processing state and a processing result of the workpiece at least during laser processing or after an end of the laser processing; wherein
- a learning unit learns the laser processing condition data in association with the state amount of the laser processing system and the results of the laser processing condition data;
- when during processing of the workpiece based on given laser processing condition data, an amount of the reflected light detected by the reflected light detection unit exceeds a second predetermined level set lower than a first predetermined level set lower than an alarm level indicating that at least one of the processing head, the laser apparatus, and a laser light propagation optical component between the processing head and the laser apparatus may be damaged by the reflected light,
- the learning unit refers to the learned laser processing condition data to output laser processing condition data enabling a processing result close to a processing result of the given laser processing condition data to be predicted without the amount of the reflected light detected by the reflected light detection unit exceeding the second predetermined level;
- the learning unit has a value function varied from one laser processing content to another and defining a value of laser processing condition data;
- the learning unit provides, when a difference between a laser processing result including a processing speed obtained by an operation result acquisition unit or time expended for predetermined processing and a roughly ideal processing result including a processing speed set for each laser processing content or time expended for predetermined processing or a target processing result is small, a plus reward according to the difference, and when the difference is large, provides a minus reward according to the difference; and
- updates the value function according to the reward; and
- in the learning unit, a reward calculation unit provides a predetermined minus reward when the amount of the reflected light detected by the reflected light detection unit exceeds the second predetermined level during the processing of the workpiece based on a given laser processing condition, and the value function is updated according to the predetermined minus reward.

20. A machine learning method for learning laser processing condition data output to a control apparatus of a laser processing system, comprising:
- observing, without human intervention, a state amount of the laser processing system including output data from at least one laser apparatus, output data from at least one processing head, and output data from at least one driving apparatus for changing a relative positional relationship between the processing head and a workpiece;
- receiving, as results of laser processing condition data, output data from at least one reflected light detection unit that detects a reflected light returning to the laser apparatus, and output data from at least one processing result observation unit that observes at least one of a processing state and a processing result of the workpiece at least during laser processing or after an end of the laser processing; and
- learning the laser processing condition data in association with the state amount of the laser processing system and the results of the laser processing condition data; wherein
- the laser processing system comprises:
- the laser apparatus; the processing head; an output light detection unit; the reflected light detection unit; the processing result observation unit; and the driving apparatus, which are provided at least one each, and
- at least one control apparatus that controls the laser apparatus, the processing head, the output light detection unit, the reflected light detection unit, the processing result observation unit, and the driving apparatus; and
- when the amount of the reflected light detected by the reflected light detection unit exceeds a first predetermined level, the control apparatus cuts off or reduces the light output from the laser apparatus to a predetermined ratio without waiting for outputting of next laser processing condition data from a machine learning apparatus.

* * * * *